US010387899B2

(12) United States Patent
Fighel

(10) Patent No.: US 10,387,899 B2
(45) Date of Patent: Aug. 20, 2019

(54) SYSTEMS AND METHODS FOR MONITORING AND ANALYZING COMPUTER AND NETWORK ACTIVITY

(71) Applicant: SignifAI Inc., Sunnyvale, CA (US)

(72) Inventor: Guy Fighel, Sunnyvale, CA (US)

(73) Assignee: New Relic, Inc., San Francisco, CA (US)

( * ) Notice: Subject to any disclaimer, the term of this patent is extended or adjusted under 35 U.S.C. 154(b) by 0 days.

(21) Appl. No.: 15/822,725

(22) Filed: Nov. 27, 2017

(65) Prior Publication Data

US 2018/0114234 A1 Apr. 26, 2018

Related U.S. Application Data

(63) Continuation-in-part of application No. 15/334,928, filed on Oct. 26, 2016.

(51) Int. Cl.

| | |
|---|---|
| ***G06Q 30/02*** | (2012.01) |
| ***G06Q 30/00*** | (2012.01) |
| ***G06F 17/27*** | (2006.01) |
| ***H04L 12/24*** | (2006.01) |
| ***G06F 11/34*** | (2006.01) |
| ***G06F 11/07*** | (2006.01) |
| ***G06N 20/00*** | (2019.01) |

(52) U.S. Cl.

CPC ....... *G06Q 30/0201* (2013.01); *G06F 11/079* (2013.01); *G06F 11/34* (2013.01); *G06F 11/3409* (2013.01); *G06F 17/274* (2013.01); *G06F 17/2785* (2013.01); *G06Q 30/016* (2013.01); *H04L 41/064* (2013.01); *H04L 41/0631* (2013.01); *G06N 20/00* (2019.01)

(58) Field of Classification Search

CPC ............... G06F 11/079; G06F 11/0709; G06F 11/0706; G06F 11/3006; G06F 11/34; G06F 11/3409; H04L 41/00; H04L 41/0631; H04L 41/064; H04L 43/04

See application file for complete search history.

(56) References Cited

U.S. PATENT DOCUMENTS

| | | | | |
|---|---|---|---|---|
| 6,735,484 | B1 | 5/2004 | Lenz | |
| 6,970,758 | B1 | 11/2005 | Shi et al. | |
| 9,317,829 | B2 * | 4/2016 | Anand | G06Q 10/0635 |
| 2006/0112093 | A1 | 5/2006 | Lightstone et al. | |
| 2015/0033086 | A1 * | 1/2015 | Sasturkar | G06F 11/0709 714/57 |
| 2015/0281253 | A1 | 10/2015 | Lords et al. | |
| 2016/0103888 | A1 * | 4/2016 | Fletcher | G06F 17/30477 707/722 |
| 2016/0292065 | A1 * | 10/2016 | Thangamani | G06F 8/65 |

(Continued)

OTHER PUBLICATIONS

Qiu et al. "Listen to Me if You can: Tracking User Experience of Mobile Network on Social Media" Proceeding IMC'10, Nov. 2010.*

(Continued)

*Primary Examiner* — David R Lazaro

(74) *Attorney, Agent, or Firm* — FisherBroyles, LLP

(57) ABSTRACT

A system correlates items of customer feedback to anomalous events that gave rise to the items of customer feedback and stores the correlation information in one or more databases. The correlation information it then later used to determine the probable causes of items of customer feedback received at a later time.

18 Claims, 17 Drawing Sheets

(56) References Cited

U.S. PATENT DOCUMENTS

2017/0177468 A1* 6/2017 Thangamani ....... G06F 11/3692
2017/0230229 A1* 8/2017 Sasturkar ............ H04L 41/0631

OTHER PUBLICATIONS

Landthaler et al. "Multi-level Event and Anomaly Correlation Based on Enterprise Architecture Information", Lecture Notes in Business Information Processing, Nov. 13, 2016.*
Jan. 2, 2018 International Search Report issued in PCT Application No. PCT/US2017/055848.
Jan. 2, 2018 Written Opinion issued in PCT Application No. PCT/US2017/055848.

* cited by examiner

SYSTEMS AND METHODS FOR MONITORING AND ANALYZING COMPUTER AND NETWORK ACTIVITY

This application is a continuation-in-part of application Ser. No. 15/334,928, which was filed on Oct. 26, 2016, the content of which is hereby incorporated by reference.

BACKGROUND

The present application discloses technology which is used to help a business keep a computer based production environment operating efficiently and with good performance. The "production environment" could be any of many different things. In some instances, the production environment could be a networked system of computer servers that are used to run an online retailing operation. In another instance, the production environment could be a computer system used to generate computer software applications. In still other embodiments, the production environment could be a computer controlled manufacturing system. Virtually any sort of production environment that relies upon computers, computer software and/or computer networks could benefit from the systems and methods disclosed in this application.

As computer-based production environments scale up and become larger, performance can decline. It becomes increasingly difficult to keep all portions of the system operating efficiently. There are many software applications that have been designed to monitor a production environment, and to report on key metrics and events. However, the data and reports generated by such monitoring applications can themselves be difficult to comprehend. It can be difficult to use such data and reports in a meaningful manner to restore peak performance. Also, when problems and issues arise in such a production environment, it can be very difficult for a system administrator to identify the root causes of the problems or issues based on the data and reporting provided by such a monitoring application.

For all the above reasons, there is a need for additional technology that can monitor the activity in a production environment, and identify the root causes of problems and issues as they arise. There is also a need for technology that can proactively identify problems as they arise, and which can take steps to mitigate or solve the problems without the need for human intervention.

DETAILED DESCRIPTION

Figure 1:
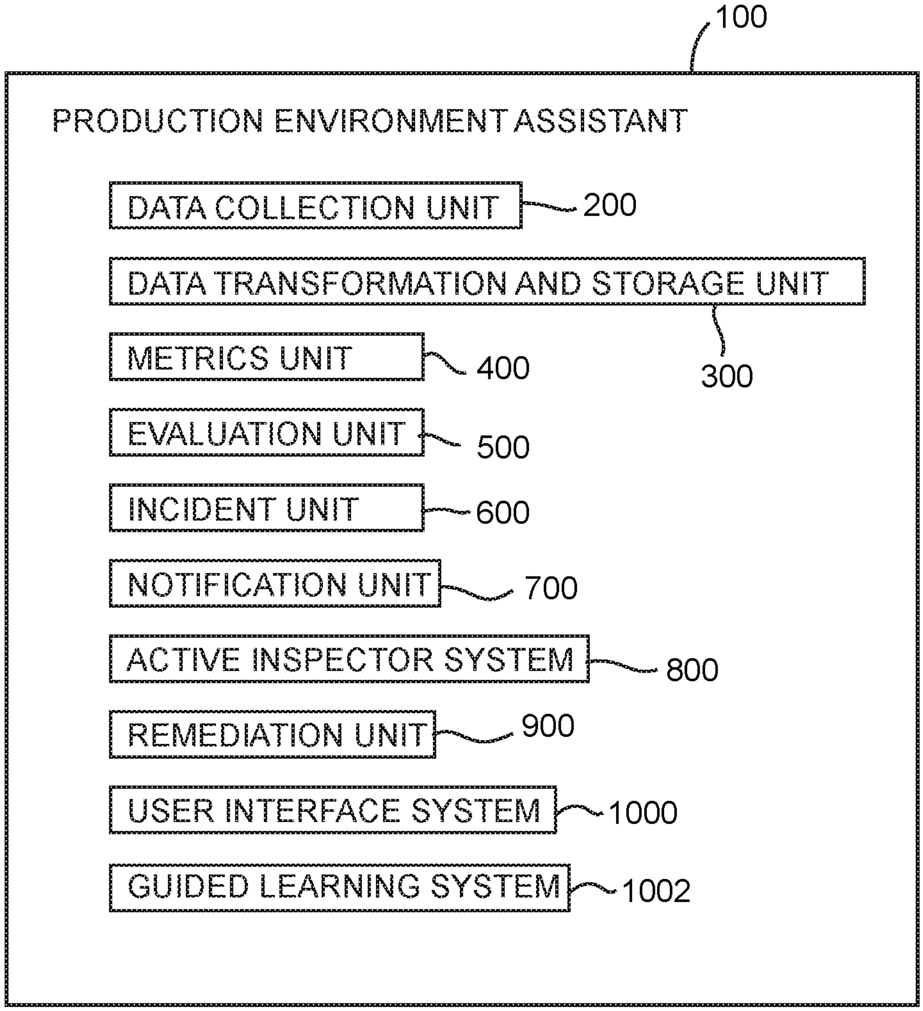
FIG. 1 is a block diagram illustrating various elements of a production environment assistant.

FIG. 1 illustrates various elements of a production environment assistant 100 which receives or obtains data from a client's production environment, which analyzes that data to determine whether issues or problems may be occurring, and which reports on any identified problems or issues. The production environment assistant 100 may also take remedial action to cure or mitigate such issues or problems.

The production environment assistant includes a data collection unit 200 which is responsible for receiving or obtaining data from a client's production environment. The data collection unit 200 would typically receive data via application programming interfaces (APIs) which have been installed and configured on the client's systems. The APIs would be configured to automatically send certain types of data to the data collection unit 200 on a periodic or continuous basis. The data being sent by the APIs to the data collection unit 200 could include data points representative of various measurements of a client's production environment, as well as event data relating to events which have occurred on the client's production environment.

The data could relate to operations performed by computer applications or programs, to the computer systems and networks themselves, and also other data related to the client's business. For example, the data being reported to the data collection unit 200 could include statistical data or information relating to business activity occurring on the client production environment, such as information relating to sales or usage of the client's production environment. Virtually any type of data relevant to a client's production environment could be reported to the data collection unit 200 via one or more APIs installed on the client's systems.

The production environment assistant 100 also includes a data transformation and storage unit 300. The data transformation and storage unit 300 receives data from a client's production environment, and transforms and enriches the data and loads that data into a data queue. The data transformation and storage unit 300 could also act to store received or obtained client data into one or more data repositories.

The production environment assistant 100 also includes a metrics unit 400. The metrics unit 400 receives or acquires data relating to a client's production environment, and then calculates various metrics using that raw data. Such calculations can include (but are not limited to) different statistical equations and algorithms, as well as outlier and anomaly algorithms. The metrics data is then stored in a metrics repository.

The production environment assistant 100 further includes an evaluation unit 500. The evaluation unit obtains or acquires data relating to a client's production environment and analyzes the data to determine if a pre-defined incident has occurred or is occurring on the client's production environment. The evaluation unit 500 could apply traditional analysis techniques, as well as artificial intelligence based analysis techniques.

The production environment assistant 100 also includes an incident unit 600. The incident unit 600 is notified by the evaluation unit whenever a pre-defined incident is determined to have occurred. Such incidents are stored in an incident database, which can be searched via a query unit.

The production environment assistant 100 further includes a notification unit 700, which reports incidents to client and system administrators. The notification unit 700 can act through various different communication channels to deliver a notification to a client or system administrator.

The production environment assistant 100 further includes an active inspector system 800. The active inspector system 800 configures and runs individual active inspectors, each of which is setup to monitor a single client's production environment for the occurrence of a particular issue or problem. An active inspector may also be configured to take remedial action in an attempt to correct an identified problem or issue.

The production environment assistant 100 further includes a remediation unit 900. The remediation unit 900 is configured to take steps to correct or mitigate a problem or issue with the client's production environment when such problems or issues have been identified. The production environment assistant 100 also includes a user interface system 1000. The user interface system 1000 provides a variety of different ways that a client can interact with the production environment assistant 100 to obtain data or to cause various actions to occur. The user interface system could utilize speech recognition techniques in order to interact with a client using natural speech or pre-defined speech-based commands. The user interface system 1000 could also interact with various client users in more traditional ways, including graphical user interfaces presented over a computer system.

The production environment assistant 100 may also include a guided learning system 1002. The guided learning system 1002 aids a system administrator in correlating issues or problems in the business of a production environment with the rood hardware and/or software issues that give rise to those business issues and problems. Information obtained in this way can then be used to help identify the root causes of problems to that those problems can be addressed.

Each of the above discussed elements of the production environment assistant 100 are discussed in more detail below. In addition, FIGS. 11-17 illustrate the steps of various methods that would be performed by the elements of the production environment assistant 100 to monitor a client's production environment, determine when issues or problems have arisen, report on those problems or issues, as well as take remedial action.

Figure 2:
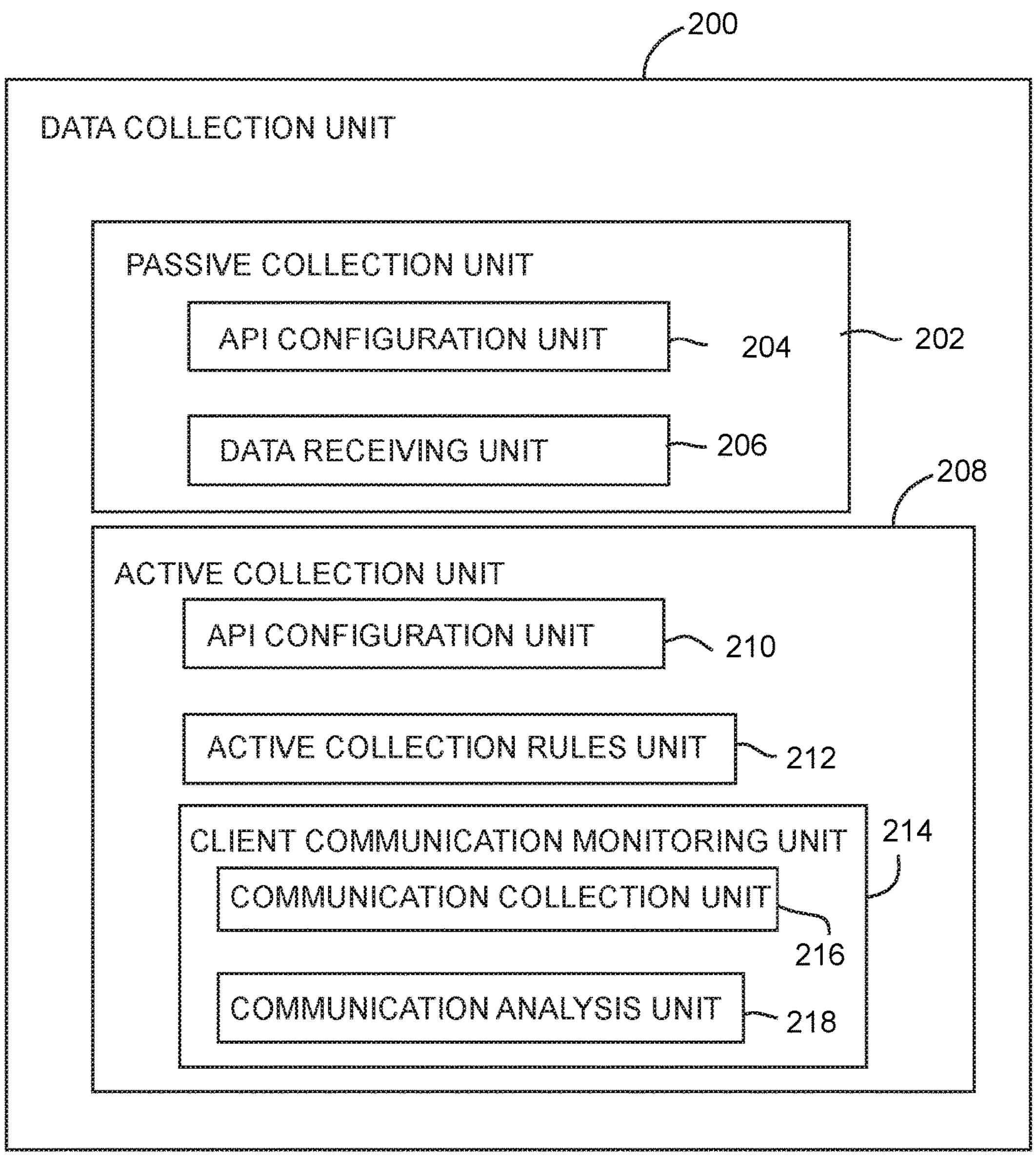
FIG. 2 is a block diagram illustrating various elements of a data collection unit.
Figure 3:
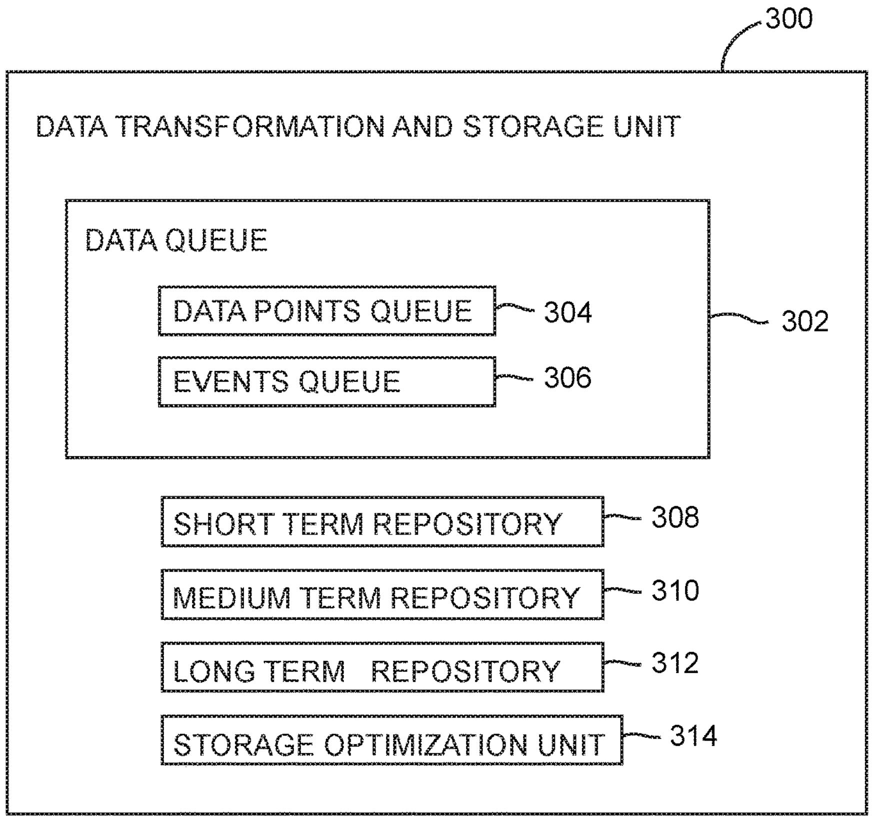
FIG. 3 is a block diagram illustrating various elements of a data collection and transformation unit.
Figure 4:
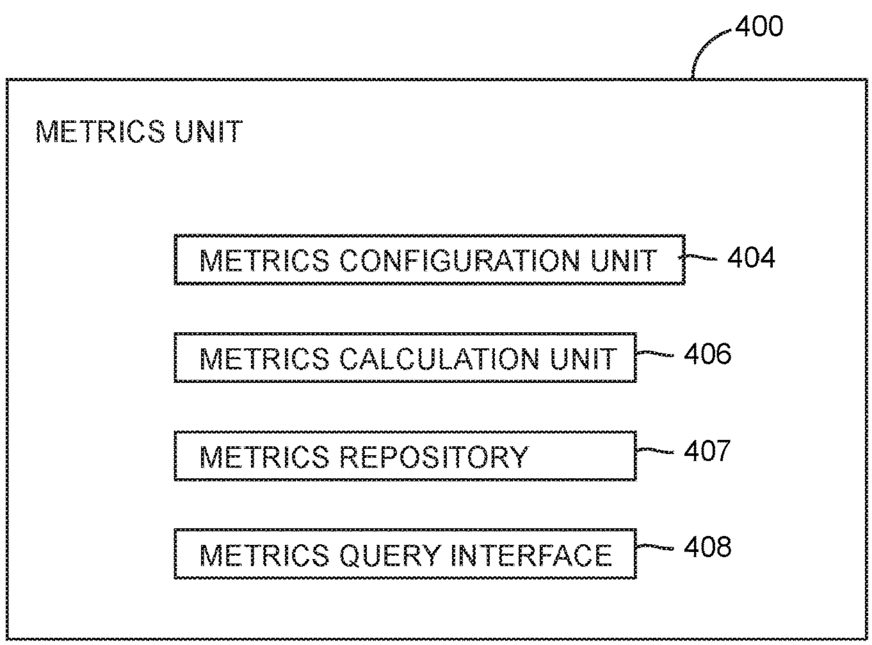
FIG. 4 is a block diagram illustrating various elements of a metrics unit.
Figure 5:
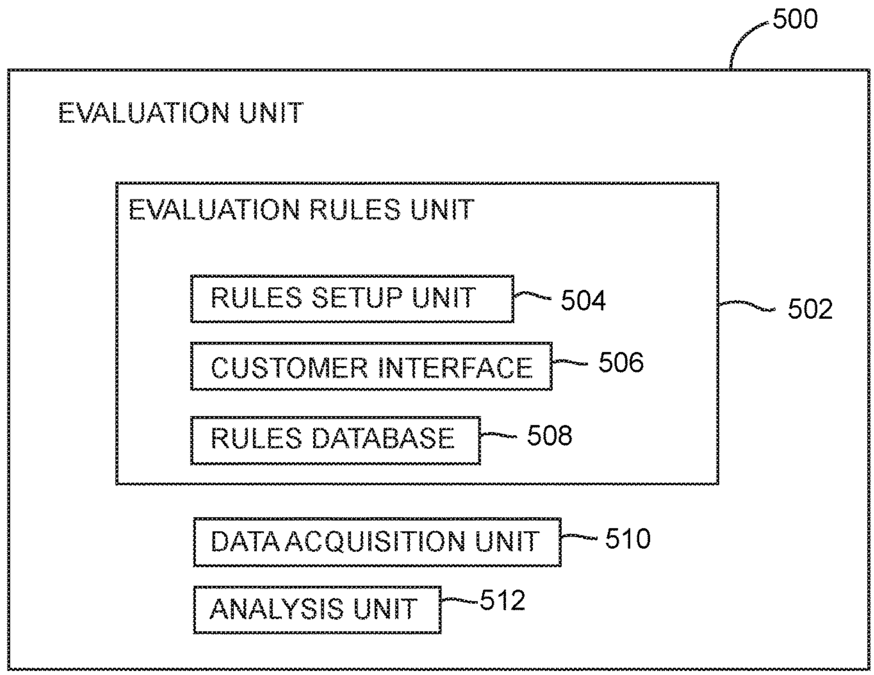
FIG. 5 is a block diagram illustrating various elements of an evaluation unit.
Figure 6:
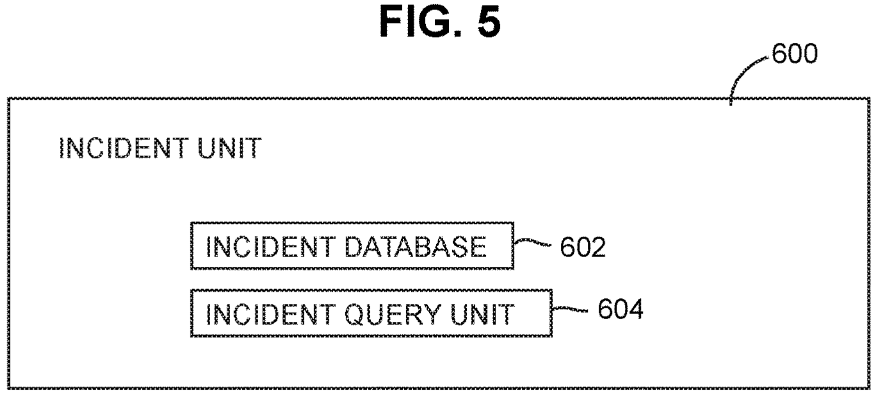
FIG. 6 is a block diagram illustrating various elements of an incident unit.
Figure 7:
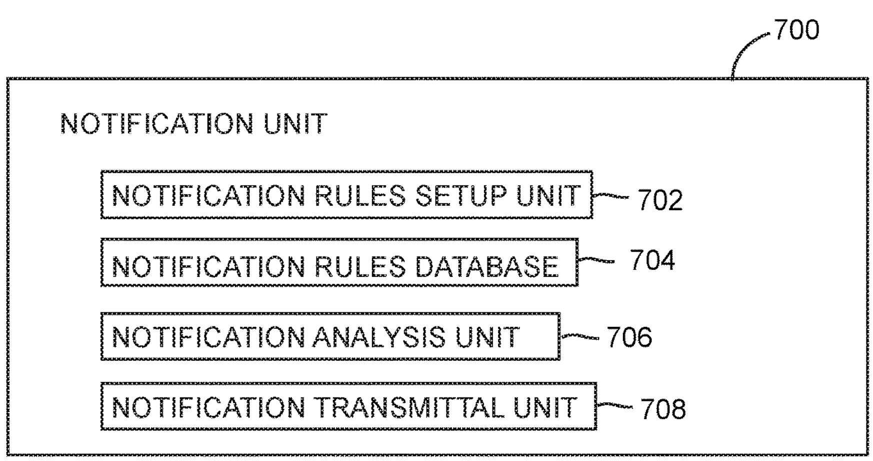
FIG. 7 is a block diagram illustrating various elements of a notification unit.
Figure 8:
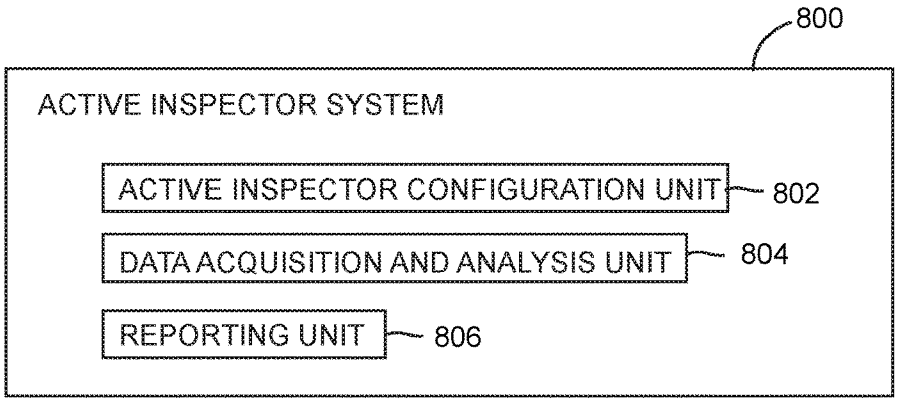
FIG. 8 is a block diagram illustrating various elements of an active inspector system.
Figure 9:
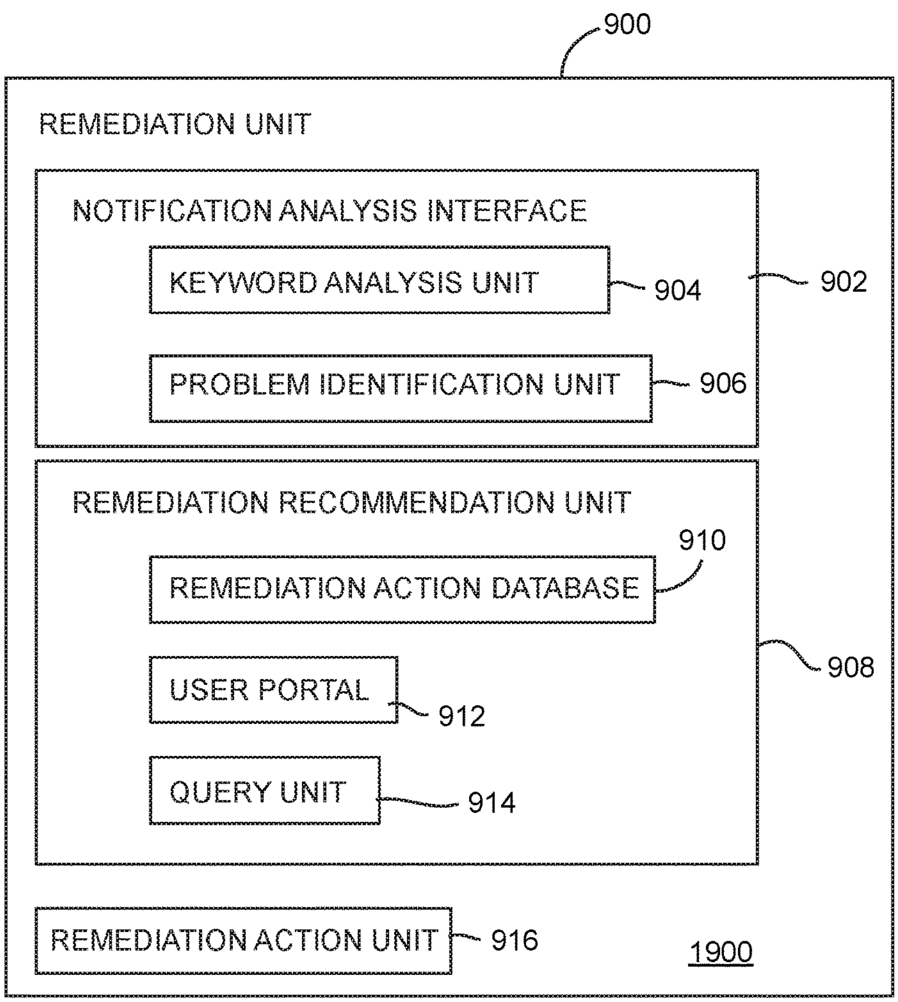
FIG. 9 is a block diagram illustrating various elements of a remediation unit.

FIG. 2 illustrates various elements of a data collection unit 200 which can be part of a production environment assistant 100. The data collection unit 200 includes a passive collection unit 202, which receives data reported from the various systems of a client's production environment. The data reported to the passive collection unit 202 may be reported via various APIs that are installed in the client's production environment. Alternatively, or in addition, a dedicated agent could be installed on client servers or networking equipment. Such an agent could utilize the one or more separate API collection methods. The APIs are configured to periodically or continuously report various items of information regarding operations on the client's production environment.

The passive collection unit 202 can include an API configuration unit 204, which can be used to help configure the various APIs that are installed on a client's production environment. In particular, the API configuration unit 204 can be used to provide one or more client-specific encryption codes, tokens or keys to the APIs installed within a client's production environment. The APIs then include this encryption code, token or key with the data they report to the passive collection unit 202.

The passive collection unit 202 also includes a data receiving unit 206, which actually receives the data reported from the APIs installed on a client's production environment. The data receiving unit 206 checks the received data to ensure that it includes an appropriate client-specific encryption key, token or code. If so, the data receiving unit 206 accepts the received data. If the received data does not include an appropriate encryption code, token or key, then the data receiving unit ignores the received data. This make it very difficult for a malicious third party to spoof artificial and/or incorrect data. The client-specific encryption code, token or key may also act to identify received data as originating from a particular client.

The data collection unit 200 can also include an active collection unit 208. The active collection unit 208 actively seeks out and obtains particular items of information from a client's production environment by sending requests for such data to the APIs installed within a client's production environment. The active collection unit 208 can include an API configuration unit 210 which is used to help configure the APIs installed within a client's production environment so that they will respond to such requests. This can include providing the APIs within a client's production environment with various encryption keys or codes which must be used by the active collection unit 208 in order to obtain information about a client's production environment from those APIs. In other words, the active collection unit 208 may need to provide an encryption key or code to the APIs within a client's production environment in order to obtain data from those APIs. The API configuration unit 210 helps to establish the encryption key or codes which will be used by the active collection unit 208 to obtain information from the APIs within a client's production environment.

The active collection unit 208 can also include an active collection rules unit 212. The active collection rules unit 212 allows a system administrator or a client to set up pre-defined rules which will determine when and how the active collection unit 208 seeks out information from a client's production environment. Once such rules have been established, the active collection unit 208 acts to follow the rules.

The active collection unit 208 can further include a client communication monitoring unit 214. The client communication monitoring unit 214 can include a communication collection unit 216 which monitors communications which are generated by or received by various individuals employed by or associated with a particular client. This can include collecting copies of email messages, text messages, instant messages, other forms of written communications, as well as copies of audio communications passing between certain individuals. A communication analysis unit 218 then analyzes the client communications collected by the communication collection unit 216 to help determine whether certain activity is occurring within a client's system or production environment.

The goal of collecting and analyzing client communications is to determine if a problem or issue has arisen within a client's production environment. To that end, the communications analysis unit 218 can search client communications for certain key words that are associated with a particular issue or problem. If one or more key words that relate to a specific type of problem or issue is found in the client communications, the communications analysis unit 218 is able to send that information to the evaluation unit 500 for deep correlation with other signals received by the system. It may send a notification about the potential issue or problem to a system administrator, or possibly to other elements of the production environment assistant so that a more detailed check could be performed, or so that remedial action can be taken.

The communications analysis unit 218 could compare key words in client communications to information technology words that have known applicability in certain contexts. The goal of the analysis is to determine a client's intent and acts with respect to specific types of issues or problems. A dictionary of information technology or computer words could be consulted for this purpose. Moreover, the communications analysis unit 218 may build up such a dictionary or database of key words over time, where certain key words become associated with certain types of problems. Such a dictionary or database could be specific to a particular client, or it could have broader applicability to multiple clients. This type of historical knowledge can be highly valuable in identifying when a problem has reoccurred.

The communications analysis unit 218 may use Natural Language Processing (NLP) algorithms to first build a corpus of IT systems intents and IT systems assets. For example, an intent is an action that can be taken automatically or manually on a system. "Restart", "Increase", "Reboot", "Shutdown", "Delete", "Add", "Scale", "Tune" are all examples for intents or actions that can be taken on an IT system. "CPU", "Memory", "Subnet", "Network Interface", "Garbage Collection", "I/O", "Disk" are all IT terms. Numbers and percentages, as well as nouns, are the bounding pieces creating the overall sentence semantics. For example, when a human is reporting via a computer messaging system: "Due to High CPU usage, I needed to restart server name: abc123" the communications analysis unit 218 analyzing the sentence would identify the key words such as "Due", "High", "CPU", "Restart", "abc123". Identifying those key words and sending them to the evaluation unit 500, helps building causality and remediation connections between generic IT components which can be adapted for a specific environment or which can be used transitively in a broader IT systems environments.

As mentioned above, the types of data that can be collected by the data collection unit 200 can include various data points about individual computer systems or networks which exist within a client's production environment. The data points can also relate to the operations of individual software applications which are running within a client's production environment. Moreover, the data acquired by the data collection unit 200 can include information about how the business is running, such as financial information, sales data, traffic within an online retailing system, traffic within a communication system, as well as virtually any other type of data relating to the operations of a client's production environment.

Many clients will have already installed various monitoring systems or monitoring software applications to monitor the operations of the client's production environment. The data collection unit 200 can obtain information reported by those separate monitoring systems, often through APIs provided with those monitoring systems or monitoring software applications. Examples of such monitoring systems or monitoring software applications include Graphite, New Relic, Appdynamics, Datadog, Ruxit (by Dynatrace), Takipi, Rollbar, Sensu, Nagios, Zabbix, ELK Stack, as well as virtually any other production environment monitoring tool.

The data transformation and storage unit 300 of the production environment assistant 100 includes a data queue 302. Data and information obtained by the data collection unit 200 is first loaded into the data queue 302. The data queue 302 could include a data points queue 304 and an events queue 306. The data queue 302 is configured to hold a substantial amount of data which has been received from various clients' production environments. For example, the data queue 302 could be configured to hold up to one week's worth of data reported from a plurality of different client production environments. By placing the data immediately into the data queue 302, one can ensure that received data is never lost.

A storage optimization unit 314 then analyzes the data in the data queue 302 and stores all or various portions of the received data into a short-term repository 308, a medium-term repository 310, and a long-term repository 312. The storage optimization unit 314 can act to store the data in a highly efficient manner to minimize data storage costs. In addition, the storage optimization unit 314 may be responsible for breaking received data into component parts, and storing the received data in pre-defined formats which make it easier to analyze that data a later point in time.

The storage optimization unit 314, implements a configuration template that supports extending the different storage types and periods. For example, the template may include categories which first utilize extremely short time repository by memory only storage. This might be implemented as a tmpfs file system on each node, or by any other in-memory type technology such as caching layer (Redis, Memcache, RabbitMQ, ActiveMQ or any other related technology). The template might also include the short term, medium term and long term storage layers accordingly. The configuration template also might include each storage layer priority, fallback policy determination (in case of a write or read failure) and object type to be stored.

By checking first with the configuration template, the storage optimization unit 314 computes in real-time for each storage object, what is the optimal storage layer to use, and then implements a tiered-storage mechanism based on the policy. Once an object needs to be retrieved, since the object type and time is already known, it's possible to skip the search action and point directly to the relevant tier. This provides a great advantage with storage cost as well as performance.

The storage optimization algorithm can also split the actual data between different tiers and split it into separate files. For example, if a data stream contains 1 month of data points, the optimization storage unit 314 reads the policy template and based on time, priorities, cost or any other attribute, that the 1-month of data points can be split into smaller sections, and also be split across the different storage types. On read request, each specific piece is retrieved and aggregated in memory before being sent back as the full result.

A metrics unit 400, which is part of the production environment assistant 100, is responsible for calculating various metrics based upon the data which has been received or obtained from a client's production environment. The metrics unit 400 includes a metrics configuration unit 404 which allows a system administrator and/or a client to determine what type of metrics are to be calculated from the client data. A metrics calculation unit 406 then actually performs the metric calculations based on the configurations established by the metrics configuration unit 404.

Examples of metrics that can be calculated from data points received from a client's production environment include an average value, a mean, a variance, a covariance, as well as virtually any other type of metric. Such metrics can be calculated using multiple outlier detection algorithms, such as DBSCAN, Hampel Filter, HoltWinters. These metric values could be calculated for a certain period of time, or based on some other type of grouping. The metrics calculation unit 406 can utilize data pulled directly from the data queue 302 of the data collection and transformation unit 300, or data pulled from the short-term repository 308, medium-term repository 310 and long-term repository 312, or data from combinations of those sources. Calculated metrics are stored in a metrics repository 407.

The metrics unit 400 includes a metrics query interface 408 which allows system administrators, users, and other elements of the production environment assistant 100 to perform queries and obtain information from the calculated metrics information in the metrics repository 407. The metrics query interface makes it possible to obtain calculated metrics for a single client's production environment, or metrics which have been calculated for multiple different client production environments. As a result, one can compare the metrics from one production environment to the metrics in a different production environment to help identify trends, issues and problems.

The metrics calculation unit 406 may also calculate metrics of metrics. In other words, an average value of a production environment variable which has been calculated for multiple different similar production environments could be calculated by the metrics calculation unit 406 to create a global average for that variable. This global average value would then be stored in the metrics repository 407. The global average value could then be used as a baseline against which a particular client's average value is judged. The particular client's average metric value for that variable would be compared to the calculated global average value for that variable to see how the particular client's production environment compares to the global average.

The ability to compare an individual production environment metric to a global average is something that many individual companies are unable to perform. Typically, a company will only have access to their own metrics. Thus, the ability to compare metrics from one client's production environment to average values for the same metrics can be a powerful tool in helping to identify issues and problems within individual production environments. In addition, because the metric unit 400 can store not only raw data points, but also events, an aggregation of multiple attributes and combinations of events and data points are possible. This powerful combination, allows the administrator to query for calculated data points and examine correlated events at the same time. That mechanism could also be used automatically to identify potential correlations between events, system/server and time.

Event correlations are the methods and means for detecting the occurrence of exceptional events in a complex system and for identifying which particular event occurred and where it occurred. The set of events which occur can be detected in the system over a period of time as event streams.

The evaluation unit 500 of the production environment assistant 100 utilizes received client data as well as calculated metrics to perform various analyses that are designed to determine if issues or problems are occurring within a client's production environment, as well as how they are related to each other. Often, events are related based on the timeline and dependencies, as event correlation can take place in both the "space" and time dimensions.

The evaluation unit 500 includes an evaluation rules unit 502 which is used to set up individual rules which are custom tailored to each individual client. The evaluation rules unit 502 includes a rules set up unit 504 that allows system administrators and clients to set up various rules which determine what types of evaluations are to be performed for a client's production environment. The rules could also establish how frequently and/or under what circumstances a particular type of evaluation should be performed. The rules could also establish various other aspects of how a particular analysis is to be performed.

The evaluation rules unit 502 also includes a customer interface 506 which makes it possible for an individual customer to access the evaluation rules unit to monitor the types of evaluations which are occurring, and to also alter the evaluation rules which have been set up for the client. The evaluation rules unit 502 also includes a rules database 508 where the evaluation rules are actually stored.

An analysis unit 512 of the evaluation unit 500 conducts various analyses using the rules stored in the rules database 508. The analysis unit 512 can perform traditional analyses, as well as artificial intelligence-based analyses. For example, the analysis unit 512 could utilize a DROOLS based engine for analyzing data based on a rule base which contains expert knowledge in the form of "if-then" or "condition-action" rules. The condition part of each rule determines whether the rule can be applied based on the current state of the working memory. The action part of a rule contains a conclusion which can be drawn from the rule when the condition is satisfied. The working memory is constantly scanned for facts which can be used to satisfy the condition part of each rule. When a condition is found, the rule is executed. Executing a rule means that the working memory is updated based on the conclusion contained in the rule.

Alternatively, the analysis unit 512 could utilize various types of rules based artificial intelligence engines such as the CLIPS system, which is an open source system developed by NASA. Various other types of artificial intelligence techniques and evaluation engines could also be used by the analysis unit 512 to analyze client data and metrics, and to apply correlation and noise reduction in order to determine if a problem or issue is occurring within a client's production environment. The analysis unit 512 could also determine the root-cause of an issue based on reasoning.

The AI approach used by the analysis unit 512 utilizes knowledge obtained through the various events from the different IT monitoring solutions/sensors/agents, as well as from the end-user feedback. Reasoning is accomplished by applying rules to detect the semantics of the event, as well as generic models which rely on generic algorithms, rather than expert knowledge, to correlate events based on an abstraction of the system architecture and its components.

As an example, if events A and B are detected, and it is known that event A could have been caused by problems n1, n2, or n3, and event B could have been caused by problems n2, n4, or n6, then the diagnosis is that problem n2 has occurred, because it represents the intersection of the possible sources of events A and B. Planning is accomplished by analyzing the entire system state and conditions before applying an action or recommendation. Learning is accomplished by applying multiple machine learning algorithms in the family of supervised and unsupervised learning.

Another learning approach which could be taken is the Version Space algorithm. Given a hypothesis space H, and training data D, the version space is the complete subset of H that is consistent with D. The version space can be naively generated for any finite H by enumerating all hypotheses and eliminating the inconsistent ones. In another learning case, one would first scan a database to find frequent items. e.g. {a, b, c, d . . . }. For each pair of such items, try to create a rule with only two items. e.g. {a}⇒{b}. Then, find larger rules by recursively scanning the database for adding a single item at a time to the left or right part of each rule (left and right expansions). e.g. {a,c}⇒{b}, then {a,c,d}⇒{b}, etc.

Each rule created is tested to see if it is valid. This provides an automated and constant learning approach to rules generation and adaptation. It also provides the ability to transfer rules and reasoning between different customers. Since IT production environments can be identified with exact or similar technologies, there are specific technology signatures that might be used. For example, customer A could set rules related to its environment that is deployed inside container technology such as Docker. Since the container technology itself is well recognized, it has a set of sensors and parameters that are always relevant in any deployment. Once the base signature is detected with Customer B, the system might inject the same generic rules and recommend the user to make the relevant adaptation to his own needs.

Last, natural language processing (communication), perception and the ability to act is also implemented as part of the remediation engine. Some of the Preventive monitoring approaches include statistical analysis (mostly Bayesian networks), neural networks and fuzzy logic.

The evaluation unit 500 can also include a data acquisition unit 510, which is used by the analysis unit 512 to obtain the data needed to perform a particular type of analysis. The data acquisition unit 510 can obtain data from the metrics repository 407, and also from any of the data sources provided by the data collection and transformation unit 300. In some instances, the data acquisition unit 510 may engage the services of the active collection unit 208 to obtain certain data needed to perform an analysis.

If the analysis unit 512 ultimately concludes that a problem or issue is occurring or may be occurring within a client's production environment, the analysis unit indicates that an "incident" has occurred. The term "incident" is a broad term which is intended to apply to any type of activity, trend, occurrence or event which could be viewed as an issue or problem for a client's production environment. Incidents can be raised once a specific condition has been confirmed by the evaluation unit 500. A condition can be an Anomaly detected, a specific metric calculation or data point that is above or below a threshold, an event (such as a new code deployment, a new scaling activity detected or a configuration change detected), a complicated computation such as rate of change, or even a combination between all of the above. Incidents can be analyzed as well and take into account for the next evaluation cycle.

When incidents are determined to have occurred, the incidents are reported to the incident unit 600. The incident unit 600 includes an incident database 602 where such incidents are recorded. The incident unit 600 also includes an incident query unit 604 which can be used to query information in the incident database 602. Queries could be performed for a single client's production environment. Alternatively, the incident query unit 604 could allow a user to perform a query for the same or similar incidents that have occurred across multiple different client production environments.

For example, if a new specific type of incident has occurred for the first time for a first customer's production environment, one could then query the incident database 602 to determine if the same or a similar incident has occurred in other client production environments. If so, one could then look to those other client production environments to determine what sort of remedial action cured or mitigated the incident. Thus, the ability to query for incidents across all client production environments provides a valuable tool which can help to quickly determine how to solve or mitigate issues.

This ability to monitor and learn from multiple client production environments dramatically increases the knowledge base compared to a system that is dedicated to only one production environment. Also, the ability to review data generated from multiple client production environments helps with reasoning and causation inference. The ability to index in a shared fast data store that includes a knowledge base of incidents across clients, environments, events and data points allows for similarities algorithms based on time, semantics, key-terms and dependencies between systems.

For example, if the same event name occurred after a specific sequence, the system assigns that sequence, and for each step a number, as a representation. Applying sequence matching, similarities algorithms such as Hamming Distance, BM25, DFR, DFI, IB similarities, LM Dirichlet, LM Jelinek Mercer similarity as well as a priory algorithms can determine best potential match and score each relevancy. Here again, if a client only had his own past incidents to rely upon, this ability would not exist.

The notification unit 700 is responsible for notifying a client when problems or issues have occurred. The notification unit 700 includes a notification rules setup unit 702 which is utilized by system administrators and clients to determine when and/or how incidents are to be reported to a client. The rules established by the notification rules setup unit 702 are then stored in the notification rules database 704. A notification analysis unit 706 utilizes the rules in the notification rules database to determine whether or when incidents identified by the evaluation unit 500 should be reported to a client. As is explained in greater detail below, the notification analysis unit 706 could determine that it is necessary to perform a secondary analysis or investigation once an incident is determined to have occurred before the incident is actually reported to the client.

The notification unit 700 includes a notification transmittal unit 708 which is responsible for reporting incidents and other information to a client. The notification transmittal unit 708 can utilize various different communication channels to send such notifications to a client. For example, the notifications could be sent via email, text messaging, instant messaging, via telephone calls, via pagers, or via virtually any other communication channel which can connect to a client. Likewise, the notification transmittal unit 708 could be configured to send notifications both to a client and to a system administrator of the production environment assistant 100. Typically, the rules in the notification rules database 704 will indicate who should receive such a notification, and how the notification is to be transmitted.

The production environment assistant 100 also includes an active inspector system 800. The active inspector system 800 includes an active inspector configuration unit 802 which would be used to configure individual active inspectors for a particular client. In other words, a particular client could have multiple active inspectors, all which are simultaneously operational. Each of the individual active inspectors would be configured to look for or analyze for a particular type of problem or issue.

The active inspector system 800 includes a data acquisition and analysis unit 804. The data acquisition and analysis unit 804 could obtain information from the data queue 302 of the data collection and transformation unit 300, from the short-term repository 308, the medium-term repository 310 and/or the long-term repository unit 312. The data acquisition and analysis unit 804 can also seek information which has been calculated by the metrics unit 400 and stored in the metrics repository 407. Moreover, the data acquisition and analysis unit 804 could utilize the services of the active collection unit 208 of the data collection unit 200 to actively obtain the various items of information directly from a client's production environment through APIs that have been configured on that client's production environment.

If necessary, the data acquisition and analysis unit 804 could utilize the services of the metrics unit 400 to calculate metrics from obtained data. The data acquisition and analysis unit 804 could also utilize the services of the evaluation unit 500 to evaluate acquired information and metrics. Ultimately, the data acquisition and analysis unit 804 determines whether or not the issue, event, problem or incident that it has been configured to monitor for has occurred. If so, a reporting unit 806 of the active inspector system 800 would then report about the occurrence of that issue, problem, event or incident. The reporting unit 806 could utilize the services of the notification unit 700 to accomplish the reporting.

The production environment assistant 100 also includes a remediation unit 900. The remediation unit 900 is configured to take active steps in an attempt to correct or mitigate any problems or issues which may have occurred within a client's production environment. The remediation unit 900 includes a notification analysis interface 902. The notification analysis interface 902 receives notifications about incidents which have occurred, those notifications having been sent via the notification unit 700. A keyword analysis unit 904 then analyzes the notification to determine whether certain keywords exist within the notification. A problem identification unit 906 utilizes output from the keyword analysis unit 904 to determine if the reported incident is indicative of a pre-defined type of problem.

If the notification analysis interface 902 ultimately determines that a pre-defined type of problem or issue has occurred, the remediation recommendation unit 908 reviews various items of information to determine if there is an established protocol for correcting, mitigating or otherwise dealing with the identified issue or problem. The remediation recommendation unit 908 can look in a remediation action database 910 for pre-defined ways of helping to alleviate a problem or issue. The remediation recommendation unit 908 can also include a user portal 912 which allows various users to contribute to the remediation action database 910.

In one particular implementation, the remediation action database 910 can utilize Ansible Playbooks. A remote execution model over secure shell (SSH) is used to execute the procedure on each host, or by executing a set of API instructions on the infrastructure, such as Amazon Web Services Public Cloud provider, Google Cloud, Microsoft Azure Cloud or any other public or private cloud service (such as Cloud Foundry, OpenStack and others) as long as they support Application Protocol Interface (API). By providing a single repository and exposing it based on remediation key words, systems and actions, anyone can search for a specific use case and find a relevant playbook or remediation script. A contributor can share from his own experience by writing a remediation script according to a pre-defined template, and uploading it to the shared repository. It is then possible for the system to index each key word and action term from the pre-defined template, and make it available for execution by anyone. Sharing the system and remediation knowledge increases remediation reliability and decreases execution errors.

In some instances, the remediation recommendation unit 908 may find that there are multiple remediation actions in the remediation action database 910 that could be used to address an identified issue or problem. When that occurs, the query unit 914 could be used to obtain input from a system administrator or a client about which of the remediation actions to take in an attempt to mitigate or solve the identified issue or problem. In addition to allowing a system administrator or client to select one remediation action, the system administrator or client might also identify multiple remediation actions that are to be taken in a particular order until the identified problem is cured or mitigated.

Once a remediation action or group of remediation actions is identified, a remediation action unit 916 then interacts with a client's production environment to carry out the remediation action(s) in an attempt to mitigate or solve the problem or issue.

Figure 10:
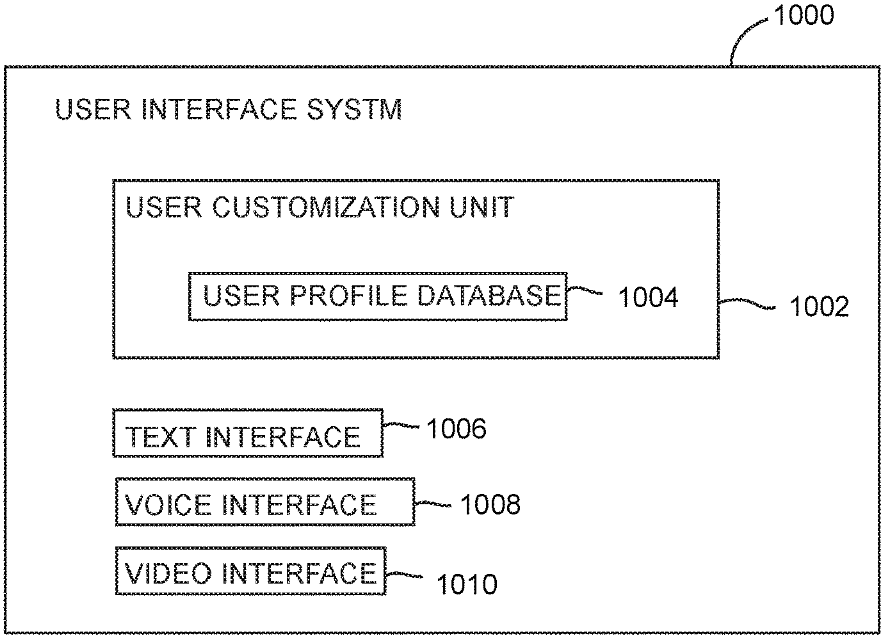
FIG. 10 is a block diagram illustrating various elements of a user interface system.

A user interface system is illustrated in FIG. 10. The user interface system 1000 is customizable and can adapt to various different user environments. A user customization unit 1002 determines how best to interact with a customer and his computing devices, and stores that user customization information in a user profile database 1004. The user customization information can include information about the specific devices and display screens which a user typically uses to interact with the production environment assistant 100. The user customization information can also include information about whether the user interacts via text, voice and/or video. Further, the user customization information can include information that allows the user interface system 1000 to adapt to specific user characteristics or traits, such as knowledge about a user's accent that must be taken into account when processing the user's voice commands. The information stored in the user profile database 1002 allows the user interface system 1000 to format information so that it can be effectively displayed on specific user computing devices, such as specific display screens, specific smartphones, tablets, and other mobile devices.

The user interface system 1000 also is capable of performing various different forms of user interaction. If the user choose to interact via text, a text interface 1006 performs the user interaction. The text interface could utilize one or more ChatBot components or services to communicate with a user. A ChatBot is basically a computer program designed to simulate conversation with human users, especially over the Internet. A ChatBot is typically powered by rules and artificial intelligence so that the user perceives that he is interacting with another human. The text interface 1006 could include one or more of its own ChatBot components or services, or the text interface 1006 could utilize ChatBot components or services provided by other service providers. For example, the text interface could utilize a ChatBot that is provided by Facebook Messenger, Slack, HipChat, Telegram, and other online providers.

In a typical text-based interaction, a user would ask a question or issue a command via text, and the text interface 1006 would interpret the text and cause appropriate action to occur. For example, a user could issue a text based question, and the text interface 1006 would interpret the question, cause an answer to be obtained, and then provide the answer to the user via a text-based response. The text interface 1006 may utilize Natural Language Processing algorithms to interpret a user's text question or command.

In addition to the text interaction, the user interface system 1000 supports other means of user interaction, such as via audio and video. A voice interface 1008 could receive user input in the form of voice questions or commands. The voice interface 1008 then interprets the user's spoken audio input and causes appropriate actions to occur. For example, the user could issue a spoken audio question, and the voice interface would then interpret the question, obtain an answer to the question, and provide that answer to the user. The answer could be provided as an audio answer, as a text based answer, as a graphical response provided on a user display screen, or as combinations of those response formats.

A user's spoken audio input could be captured by any sort of user interface that includes a microphone. Such devices could include a computer, a smartphone, or a dedicated voice interface such as the Amazon Echo and the associated Alexa Skills SDK. Alternatively, the user could interact with the voice interface 1008 of the user interface system 1000 via the Apple SiRi interface, and the associated SiRi SDK.

When a user is making use of a separate voice interface, such as the Amazon Echo and Alexa voice service, the user interaction provided to the user interface system 1000 of the production environment assistant 100 could actually be provided in the form of text which is interpreted by the text interface 1006. For example, a user's voice command could be captured by the Echo device, and the Echo device or an associated Alexa skill could convert the spoken input into text. The text is then provided to the text interface 1006, which interprets the user's spoken input and takes appropriate action. The text interface 1006 could then provide a text-based response which is provided to the Echo device, and the Echo device convert the text response to audio voice which is played to the user by the Echo device. In this instance, the voice-to-text conversion and the text-to-voice conversion is not performed by the user interface system 1000, but rather by a separate entity.

If a user has a video camera, the user might also interact with the user interface system 1000 using video input. A video interface 1010 would receive the video from the user and interpret the video input. This could include interpreting different body movements and gestures depicted in the user-provided video. For example, a user is asked a yes or no question, the user could gesture with a Thumbs Up or Thumbs Down to provide a response to the question. The video interface could interpret the user's response and provide the answer to the portion of the production environment assistant 100 that posed the question.

If a user has a video camera, the video interface 1010 might also user-provided video to help accomplish user authentication. In this case, instead of having a user input a traditional user name and password, the user could simply look directly at the video camera, and the user's image is captured and used for user authentication purposes. Once the user has been identified, the user's profile could be accessed to determine the user's preferences for the subsequent user interactions.

The video interface 1010 could also be used to cause a "character" or "persona" to be displayed on a user display screen. The character or persona might have an abstract human-like face, body or other depiction, and the character or persona would represent the production environment assistant 100 in user interactions. A system character or persona that interacts with a user could be customized to have a particular name or appearance. The user may then use the character or persona's name when asking a question or issuing a command. For example, a user could issue a request for information by saying "Sam, please identify all servers with over 50% CPU usage in my production system and report back after you have restarted them one after another." Such a command contains the user's intentions (Identify, Report, Restart), nouns, metrics and specifics (production system).

An interactive feedback system may be implemented through the user interface system 1000. For each event presented either by voice, video or via the traditional graphical user interface, the user has the ability to provide feedback. This feedback is critical part of the system, as it forms one of the learning inputs to the systems. The system is capable of handling several feedback types. For example, a user could indicate that an event or incident is a false-positive. A user could also indicate that a recommendation is useful or not. The user may also provide input regarding what steps the user took in order to fix a particular problem. It may also be possible for a user to upload files to the system for indexing and future reference. Such user feedback is then used to improve the performance of the production environment assistant 100.

Figure 11:
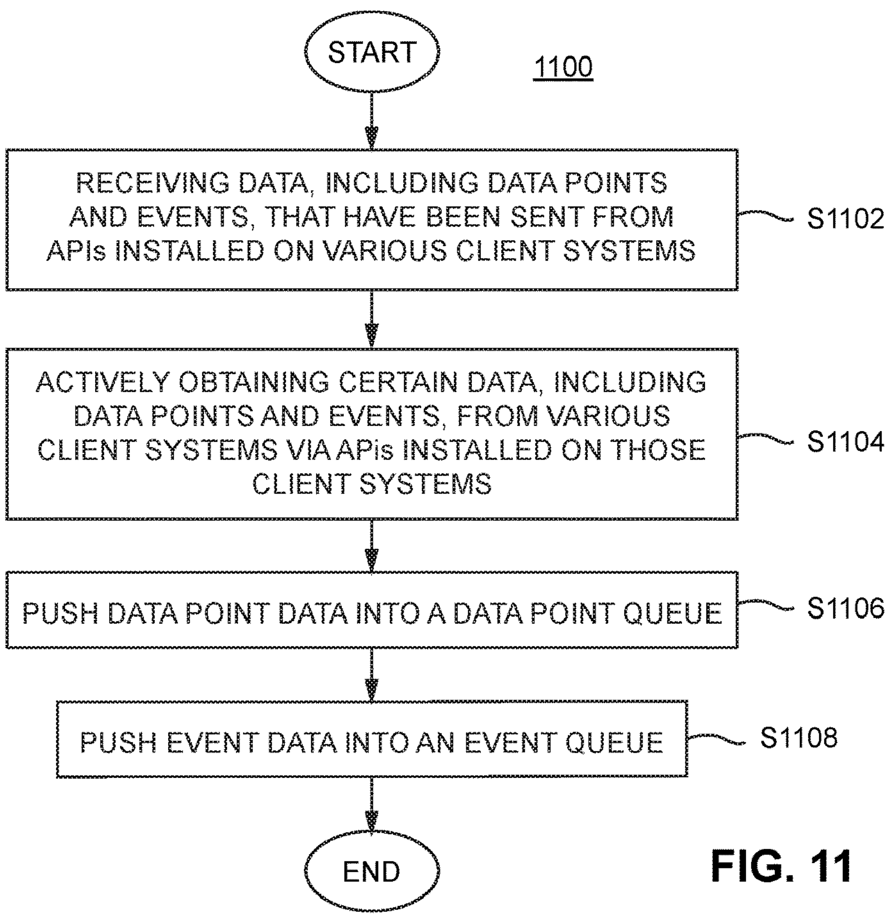
FIG. 11 is a flowchart illustrating steps of a method of collecting data from client systems.

FIG. 11 illustrates steps of a method which is performed to obtain data from a client's production environment and to store that data into one or more data queues. The method 1100 begins and proceeds to step S1102 where data reported by APIs installed on a client's production environment is received by the passive collection unit 202 of the data collection unit 200. The received data can include data points and events. Those data points and events can relate to individual elements of computer equipment, networking equipment, and also software applications which are running on the client's production environment. As noted above, the received data could also include business-related data such as financial data or traffic data.

The method 1100 also includes an optional step S1104, where an active collection unit 208 of the data collection unit 200 actively obtains certain data from a client's production environment via APIs installed on the client's production environment. In step S1106 the received data point information is loaded tin a data point queue. The method also includes step S1108, received event information is loaded into an event queue. The method then ends.

Figure 12:
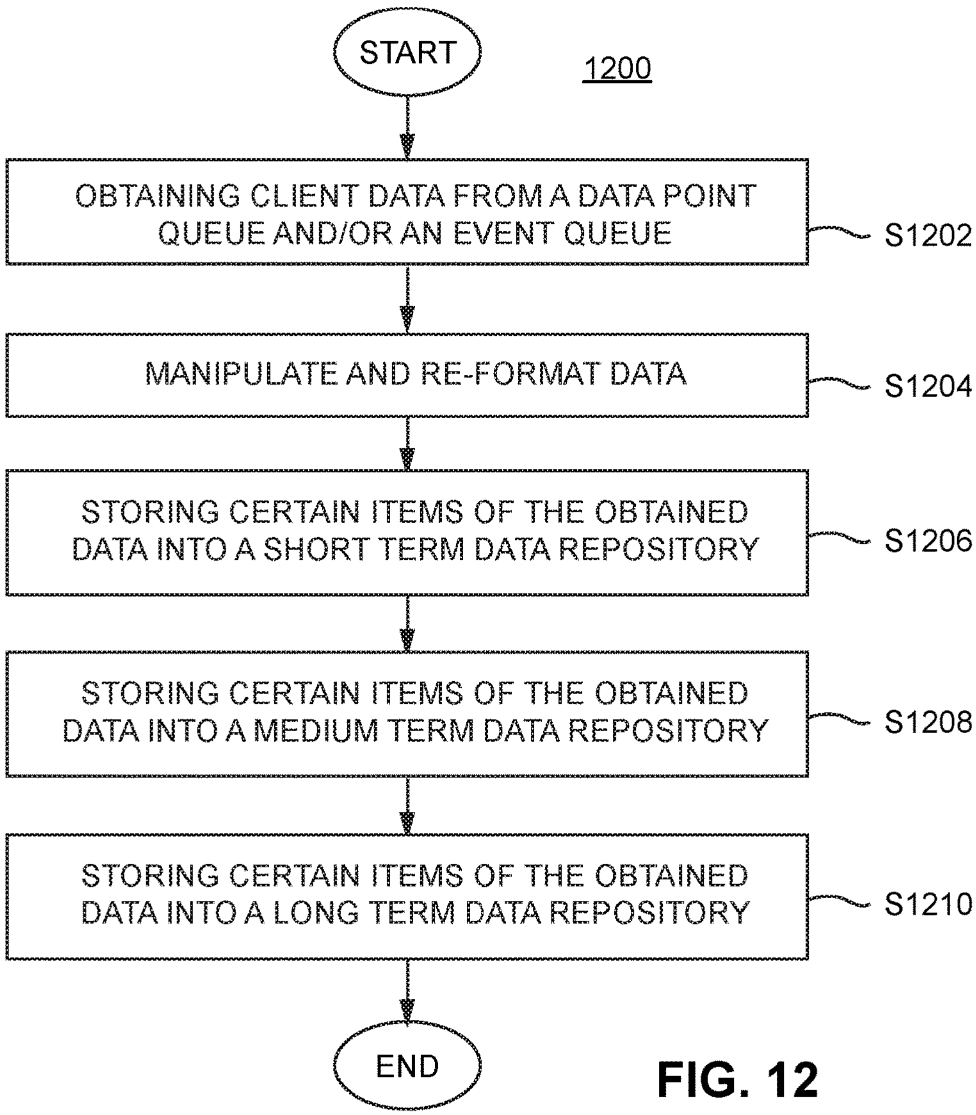
FIG. 12 is a flowchart illustrating steps of a method of storing received client data into various data repositories.

FIG. 12 illustrates steps of a method that would be performed by the data collection and transformation unit 300 to store data. The method 1200 begins and proceeds to step S1202 where a storage optimization unit 314 of the data collection and transformation unit 300 obtains client data which has been stored in a data point queue 304 or an events queue 306. In step S1004 the storage optimization unit 314 manipulates the received data in various fashions to prepare the data for storage. This can include de-serializing received data, and reformatting the received data into pre-defined formats which make later analysis of the data easier to perform. The method then proceeds to step S1206 where the storage optimization unit 314 stores some items of data into a short-term repository 308. In step S1208 the storage optimization unit 314 stores certain items of data in medium term repository 310. In step S1210, the storage optimization unit 314 stores certain items of data into a long term repository. The method then ends.

Figure 13:
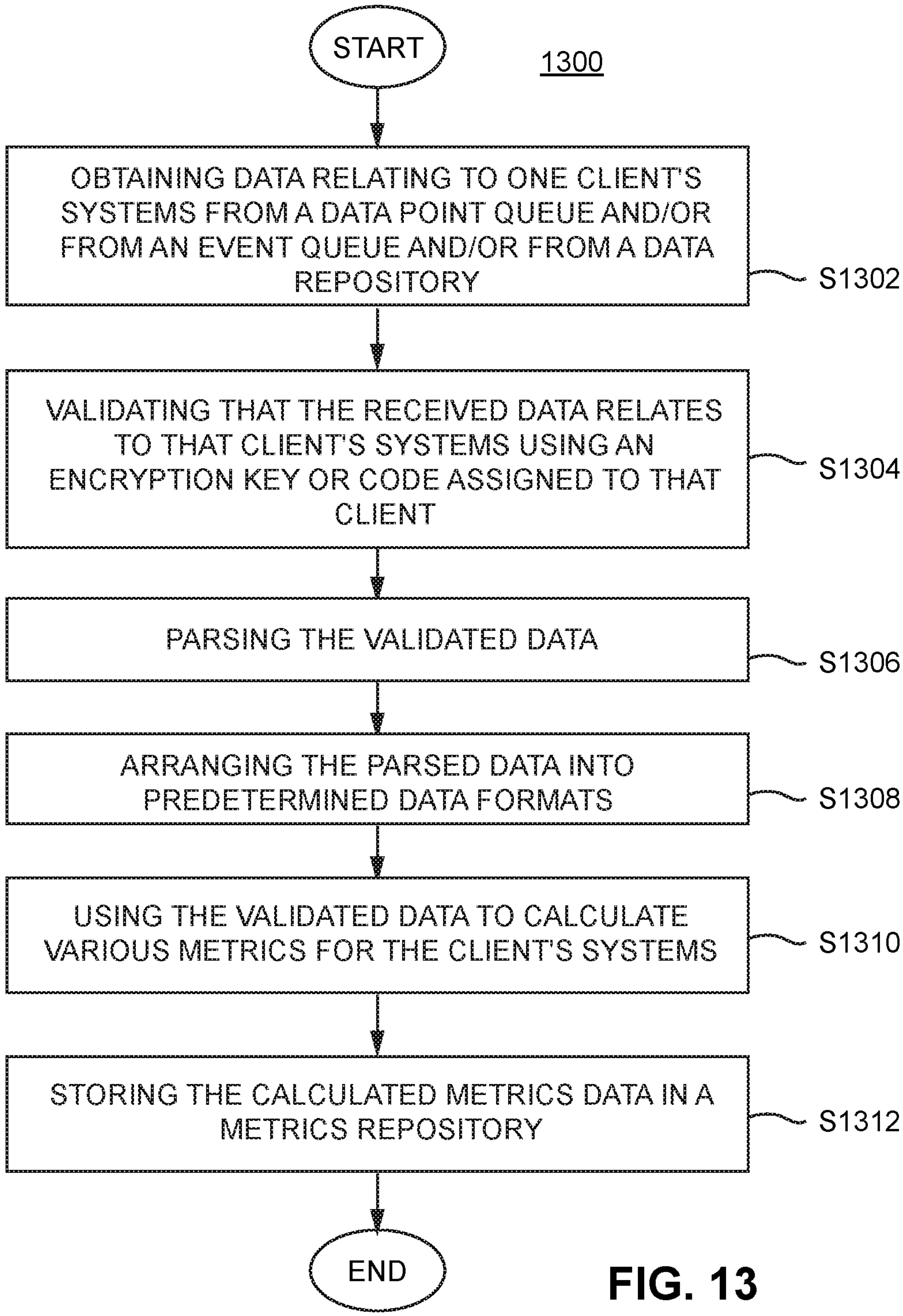
FIG. 13 is a flowchart illustrating steps of a method of calculating various metrics from collected client data.

FIG. 13 illustrates steps of a method which would be performed by a metrics unit 400 of the production environment assistant 100. The method 1300 begins and proceeds to step S1302 where data relating to a client's production environment is obtained from a data point queue 304 and/or from an events queue 306 and/or from a data storage repository, such as the short-term storage repository 308, the medium term storage repository 310 and the long-term storage repository 312. In step S1304 the data is validated to ensure that it has been received from a particular client's APIs. This can include examining the data for the existence of a client-specific encryption key, token or code which has been provided along with the data.

The method then proceeds to step S1306 where the data is parsed. In step S1308 the data is arranged into predetermined data formats. The parsing and arrangement steps S1306, 1308 are optional data steps that may or may not be performed depending upon the particular type of data which is being used and the metrics which are to be calculated.

In step S1310, a metrics calculation unit 406 then calculates various metrics using the obtained data. In step S1312, the calculated metrics are then stored in a metrics repository 407. The method then ends.

Figure 14:
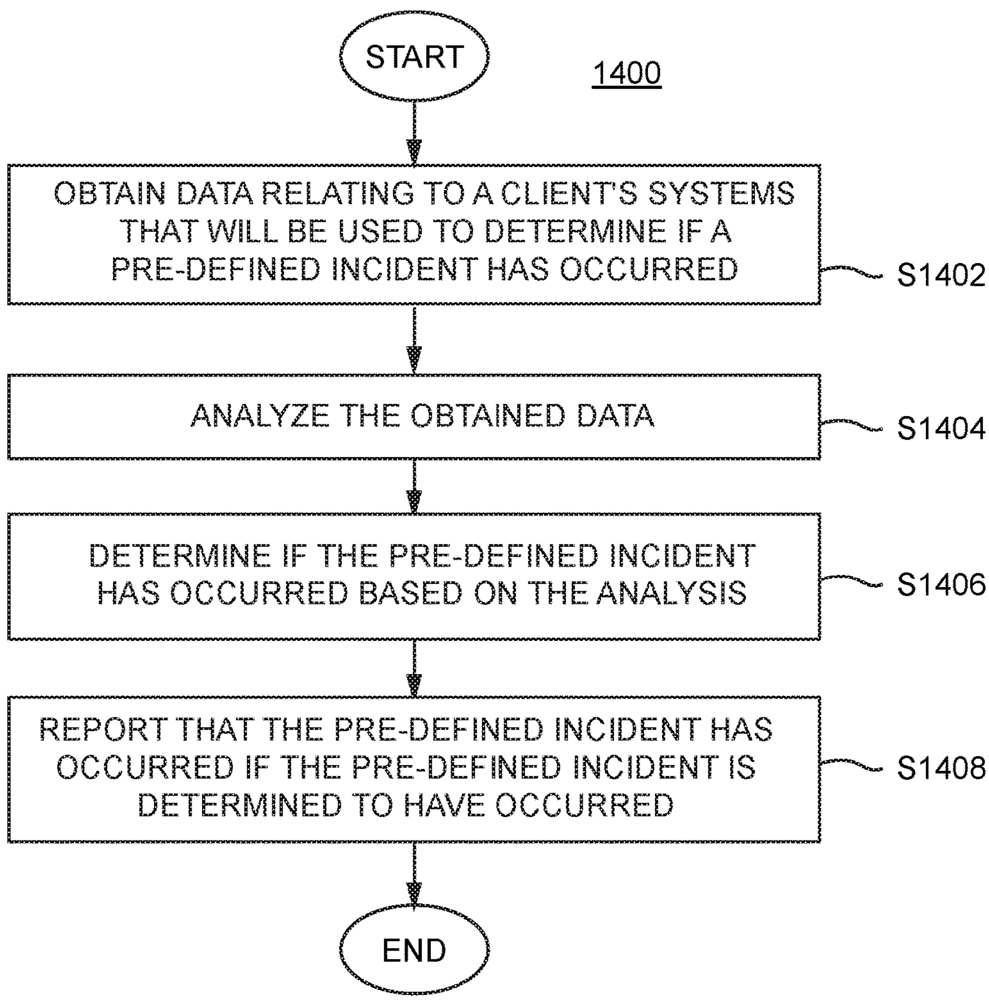
FIG. 14 is a flowchart illustrating steps of a method of analyzing data to determine if an incident has occurred.

FIG. 14 illustrates steps of a method which would be performed by the evaluation unit 500 to determine if a particular incident has occurred. The method 1400 begins and proceeds to step S1402 where a data acquisition unit 510 of the evaluation unit 500 obtains data relating to a particular client's production environment. In step S1404 the obtained data is analyzed by the analysis unit 512 of the evaluation unit 500. In step S1406, the analysis unit 512 determines whether a pre-defined incident has occurred based on the analysis performed in step S1404. If a pre-defined incident is determined to have occurred, in step S1408 the incident is reported to an incident unit 600 and/or to a notification unit 700. The method then ends.

Figure 15:
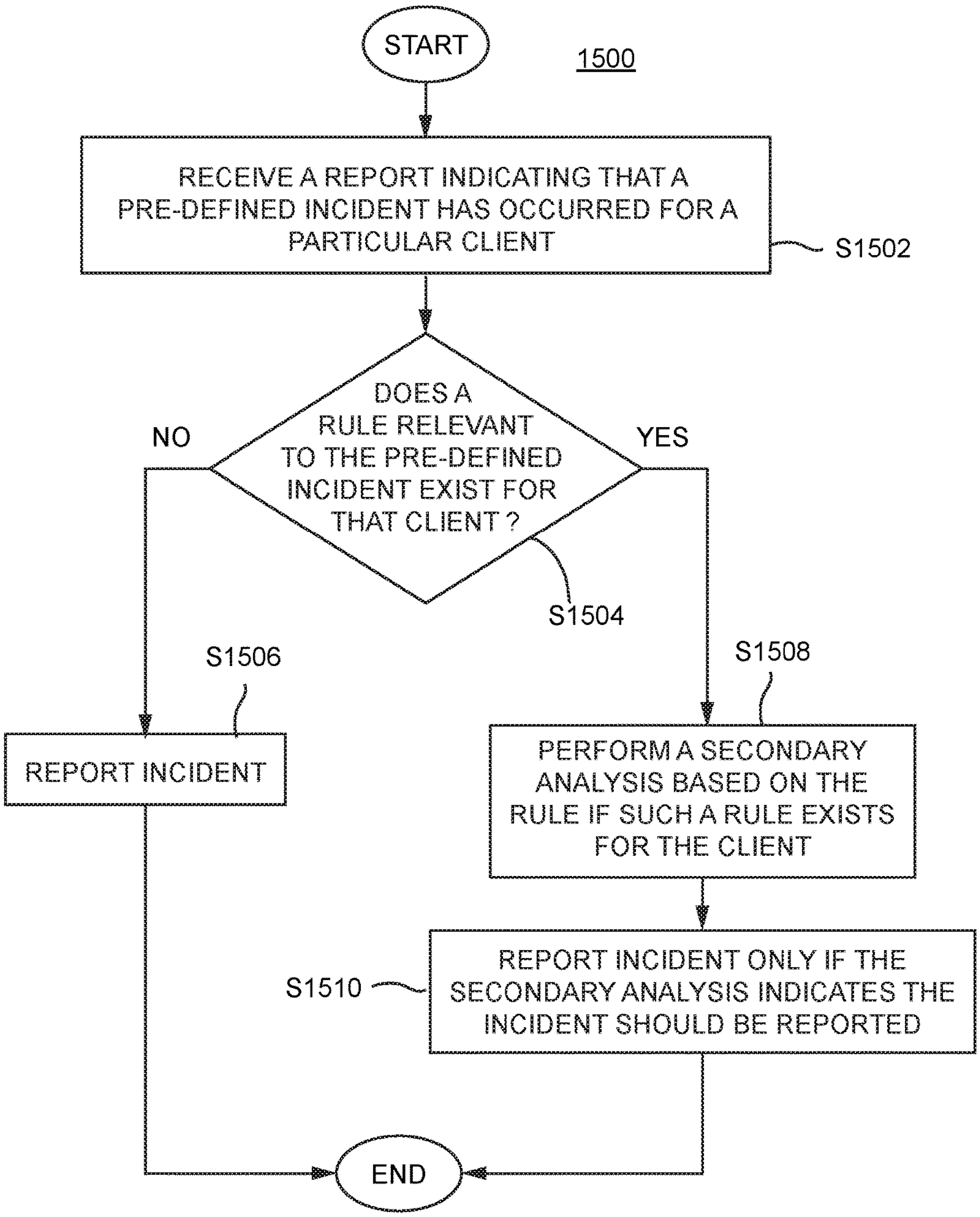
FIG. 15 is a flowchart illustrating steps of a method of reporting incidents that have occurred.

FIG. 15 illustrates various steps of a method which would be performed by a notification unit 700 of the production environment assistant 100. The method 1500 begins and proceeds to step S1502 where the notification unit 700 receives a report indicating that a pre-defined incident has occurred for a particular client's production environment. The method then proceeds to step S1504 were a notification analysis unit 706 checks a notification rules database 704 to determine if a rule for handling such an incident exists within the notification rules database 704. If no rule for the incident exists, the method proceeds to step S1506 where the incident is reported to a client and/or a system administrator according to a default reporting procedure.

If a rule for handling the incident exists, the notification transmittal unit reports the incident according to that rule. In some instances, the rule will simply indicate that the occurrence of the incident is to be reported to a client or system administrator through one or more communications channels. If that is the case, the notification transmittal unit 708 carries out the notification according to the rule.

In other instances, the rule for reporting an incident will indicate that some additional investigation or analysis is to be performed before the incident is reported to a client or system administrator. In that instance, the method proceeds to step S1508, where a secondary analysis is performed by a notification analysis unit 706 of the notification unit 700. The secondary analysis could include obtaining additional information or waiting for a predetermined period of time to determine if the incident persists. The method then proceeds to step S1510 where the incident is only reported if the secondary analysis performed in step S1508 indicates that the incident should be reported. The method then ends.

Figure 16:
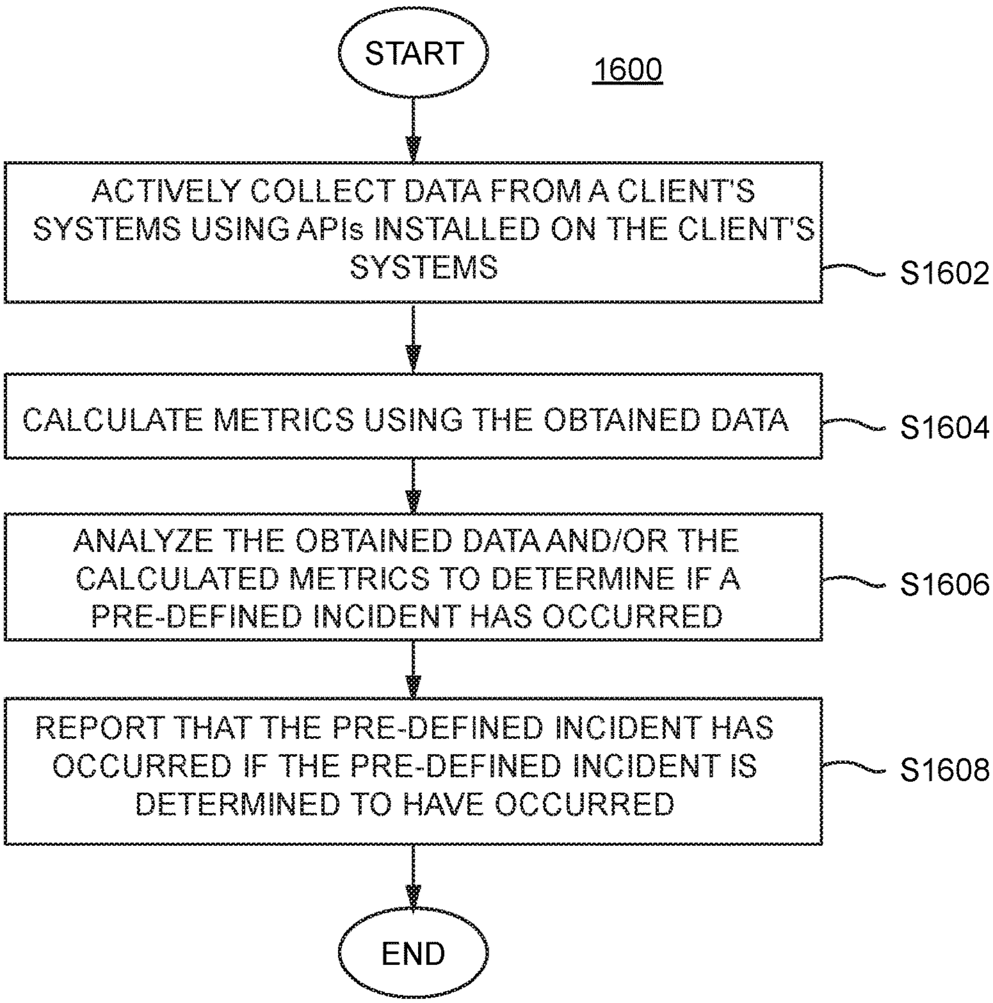
FIG. 16 is a flowchart illustrating steps of a method of actively monitoring a client's systems to acquire data and to determine whether a pre-defined incident has occurred.

FIG. 16 illustrates steps of a method which would performed by an active inspector which has been configured by the active inspector system 800. As mentioned above, an active inspector would actively check for data or events within a client's production environment to monitor for the occurrence of a particular problem or issue.

The method 1600 begins and proceeds to step S1602 where a data acquisition and analysis unit 804 of the active inspector actively collects data from a client's production environment using APIs that are installed within the client's production environment. The method then proceeds to step S1604 were various metrics are calculated utilizing the obtained data. Step S1604 could be performed utilizing the services of the metrics unit 400.

The method then proceeds to step S1606 where the obtained data and/or the calculated metrics are analyzed to determine if a pre-defined incident has occurred. This analysis could be performed with the services of the evaluation unit 500, as described above. The method then proceeds to step S1608, where the occurrence of the incident is reported, if it is determined to have occurred. Here again, the reporting on the incident could be performed with the services of the notification unit 700, as described above.

Figure 17:
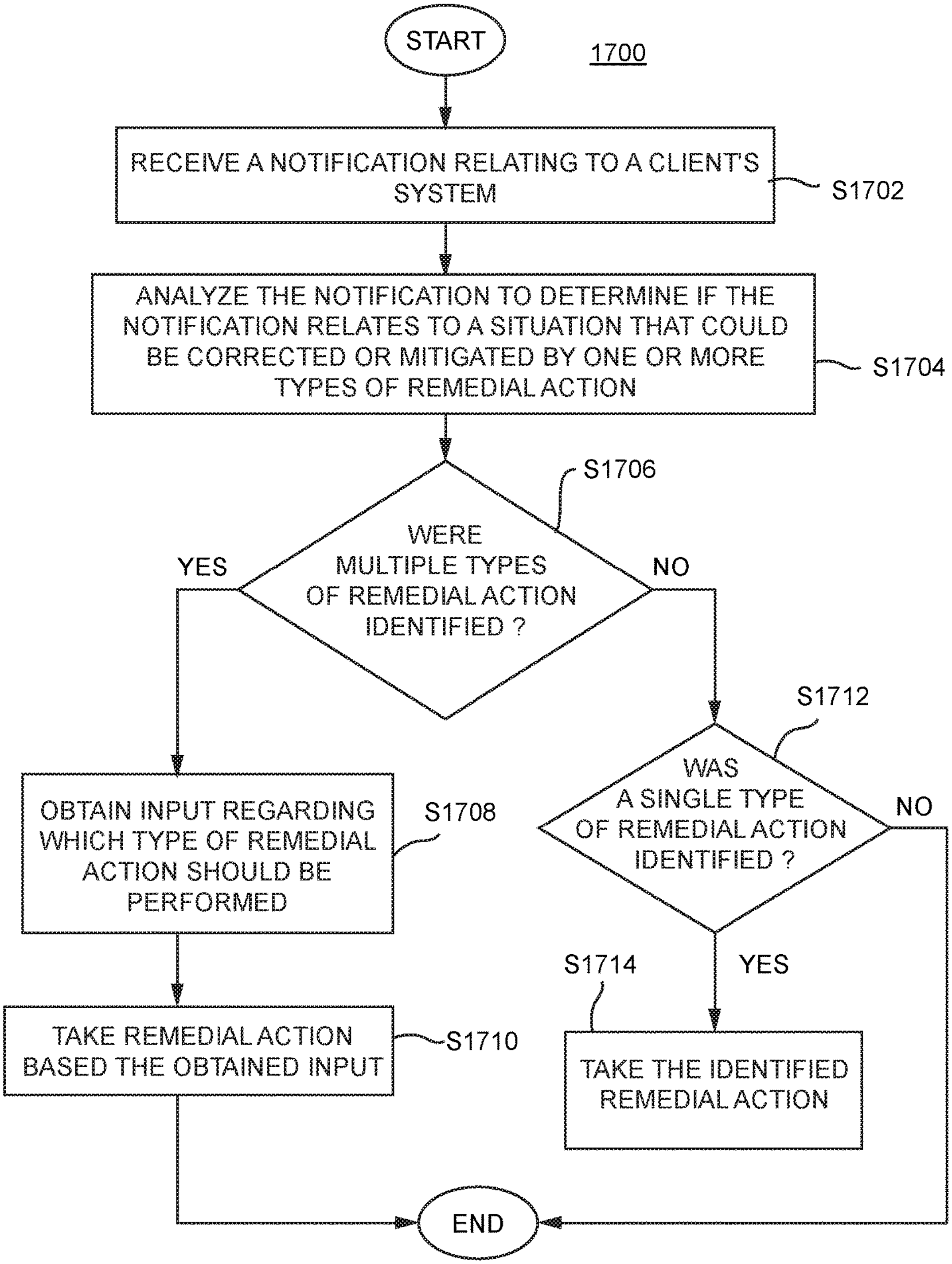
FIG. 17 is a flowchart illustrating steps of a method of taking remedial action to correct problems or issues with a client's system.

FIG. 17 illustrates steps of a method that would be performed by the remediation unit 900 to attempt to correct or mitigate a problem or issue which has occurred within a client's production environment. The method 1700 begins and proceeds to step S1702 were a notification relating to a client's system is received by the remediation unit 900. The method then proceeds to step S1704 were a notification analysis interface 902 of the remediation unit 900 analyzes the received notification to determine if it relates to an issue or problem which could be corrected or mitigated by one or more types of remedial action. This analysis can also be performed with the services of the remediation recommendation unit 908 of the remediation unit 900.

The method then proceeds to step S1706 were a check is performed to determine if there are multiple different types of remedial actions which could be performed in order to correct or mitigate the identified problem. If multiple types of remedial action have been identified, the method proceeds to step S1708 were input is obtained about what type of remedial action(s) should be performed. This could include a query unit 914 of the remediation recommendation unit 908 sending a query to a system administrator or client. The input received or obtained in step S1708 is then used to determine what type of remedial action(s) is to be performed, and in step S1701 that remedial action(s) is taken by the remediation action unit 916.

If the check performed a step S1706 indicates that no remedial action was identified, or that only a single type of remedial action is identified, the method proceeds to set S1712. In step S1712 a check is performed to determine if only a single type of remedial action was identified. If so, the method proceeds to step S1714, where the remediation action unit 916 takes the remedial action. If the check performed in step S1712 indicates that no remedial actions were identified, the method simply proceeds to the end.

One way in which a production environment assistant as described above could be used to help identify potential issues within a production environment will now be described in connection with FIGS. 18-20.

Figure 18:
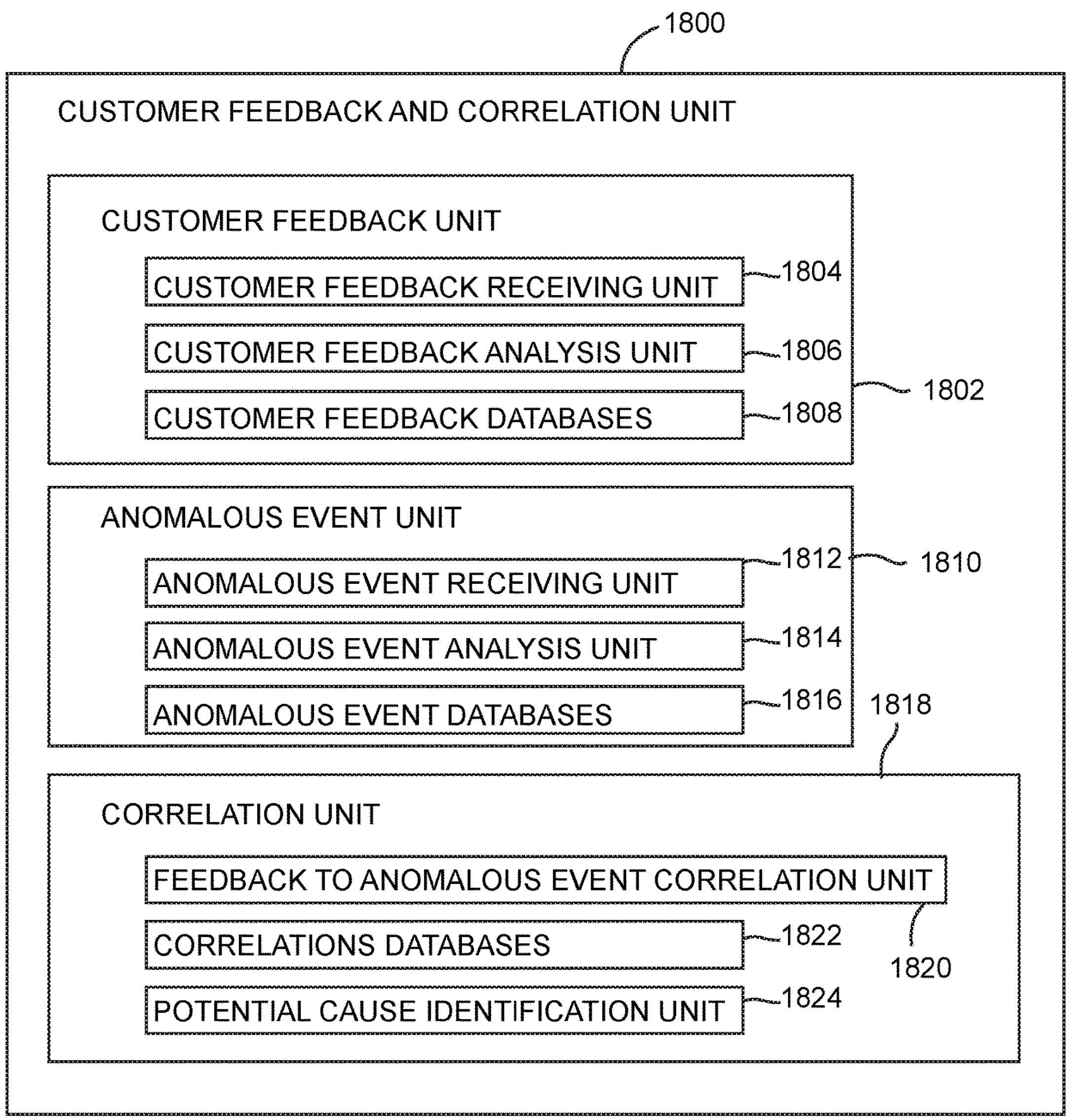
FIG. 18 is a diagram of various elements of a customer feedback and correlation unit that can correlate items of customer feedback to one or more anomalous events that occurred within a production environment.

FIG. 18 illustrates elements of a customer feedback and correlation unit 1800 that can correlate customer feedback to specific issues that have arisen within a production environment. Because it is common for a problem, issue or anomalous event within a computer-based production environment to cause customers to provide customer feedback, it is often possible to use the existence of the customer feedback to help identify the underlying problem which gave rise to the customer feedback.

The customer feedback which is utilized by the customer feedback and correlation unit 1800 is drawn from a business running a production environment. Many such businesses maintain a customer service department which receives and addresses customer feedback provided by customers. The customer feedback can be received in a wide variety of different forms.

In some instances, a customer can place a telephone call to a business' customer service line, and that telephone call can be handled either by a live operator, by an interactive voice response application, or by combinations of both where interactive voice response application directs a customer to an appropriate customer service agent. In addition, customers can provide customer feedback via email messages, text messages, or by interacting with an online graphical user interface maintained by the business. Customer feedback can also be provided in various other ways, such as in-person visits, and via regular mail, as is well known to those of ordinary skill in the art.

Most customers are motivated to provide feedback when they are having a problem, or when they are attempting to accomplish something that requires additional input or assistance. It is quite common for a customer to encounter a problem when the business' production environment is itself experiencing a problem, issue or anomalous event. In the case of a computer-based production environment, such as an online retailer, problems with the production environment can lead to customers being unable to accomplish certain functions or utilize certain services that which would normally be available. It is that point in time at which a customer will often contact a customer service representative of the business to either lodge a complaint, or to seek assistance.

As a production environment becomes more and more complex, it is often difficult for a system operator or a network engineer to correlate specific items of customer feedback or specific types of customer feedback to the underlying issues that gave rise to the customer feedback. However, this is one area where artificial intelligence based analysis techniques can be quite helpful.

An artificial intelligence analysis system can be fed information about the issues, problems and anomalous events that have occurred within a production environment, as well customer feedback that has been received for the production environment. The information about the issues and problems of the production environment can be input in various different ways, and such data could be abstracted or converted into standard data formats before being fed into the artificial intelligence analysis system. Likewise, specific items of customer feedback could be aggregated, abstracted, or converted into standard data formats before being fed into the artificial intelligence analysis system. For example, in the case of customer feedback, the words spoken by a customer to a customer service agent, or the words contained in a written communication sent by a customer, may be automatically examined and parsed to extract only the key words that are likely to have significance. Those key words could then be used to help tie the customer feedback to the underlying issue that gave rise to the customer feedback.

As increasing amounts of data is fed to the artificial intelligence analysis system over time, the artificial intelligence analysis system can spot correlations between items of customer feedback and an issue or problem within the production environment that would not be apparent to a human operator or network engineer. The tie between a particular type of customer feedback and the issue or problem that gave rise to the customer feedback may not seem logical or even possible to a human operator or network engineer. However, an artificial intelligence analysis system, unburdened by human biases and human limitations in the amount of data that can be quickly reviewed, will often identify unexpected and/or unforeseen correlations that ultimately prove to be true. Thus, the use of an artificial intelligence analysis system to correlate customer feedback to the root causes of that customer feedback can be quite valuable.

The customer feedback and correlation unit 1800 illustrated in FIG. 18 could be a part of the production environment assistant 100 illustrated in FIG. 1. Indeed, many of the elements of the customer feedback and correlation unit 1800 could themselves be elements of the production environment assistant 100 illustrated in FIGS. 1-17. For example, the customer feedback receiving unit 1804 and the anomalous event receiving unit 1812 could be part of the data collection unit 200 illustrated in FIG. 2. Thus, while the customer feedback and correlation unit 1800 is illustrated as a separate system in FIG. 18, some or all of the elements can be part of an overall production environment assistant 100, as described above.

The foregoing and following descriptions, as well as the claims of this application, make references to anomalous events. This term is intended to encompass many different things which could occur within a production environment. An anomalous event could be a problem or fault within one or more elements of the production environment, such as the failure of a computer server. An anomalous event could also simply be an occurrence which is unexpected or unplanned. An anomalous event could also be one or more elements of a production environment operating outside of normal specification, such as a processor of a computer server operating more slowly than anticipated. Similarly, an anomalous event could comprise a software application used by a production environment operating more slowly than expected, with impaired functionality, or crashing altogether. In short, when an anomalous event occurs within a production environment, it means that there is a problem or issue, or that something unexpected has occurred.

Returning now to FIG. 18, the customer feedback and correlation unit 1800 can include a customer feedback unit 1802 that obtains, processes, formats and saves customer feedback. A customer feedback receiving unit 1804 receives information about customer feedback. In some embodiments, one or more APIs can be configured and installed within a production environment to capture information about customer feedback provided by customers. In some instances, the APIs would then forward a raw or captured version of the customer feedback to the customer feedback receiving unit 1804. For example, and API could forward to the customer feedback receiving unit copies of recordings of customer service calls, and/or copies of text based customer feedback.

In other instances, the business running the production environment could maintain a well-established customer service department which operates using a customer service software application. Such customer service software applications typically log each item of customer feedback, whether it be a complaint or a request for assistance. The API installed within the production environment could then obtain information about customer feedback from the customer service software application, and forward that information on to the customer feedback receiving unit 1804.

The API running within the customer's production environment could be a passive one which passively collects and forwards information about customer feedback. In other instances, the API could be part of an active mechanism that actively seeks out certain items of customer feedback. For example, an active collection unit 208, as illustrated in FIG. 2, might be utilized to actively seek certain forms of customer feedback when a problem or anomalous event has occurred within a production environment. In such an instance, if certain forms of customer feedback are determined to have been provided, this could confirm that a particular potential problem with the production environment exists.

In some embodiments, the API installed within a production environment could perform some type of pre-processing of the raw customer feedback before forwarding the information on to the customer feedback receiving unit 1804. For example, the API could examine individual items of customer feedback as logged by a customer service software application, and then parse that data to create individual pre-formatted data items that are then passed to the customer feedback receiving unit 1804. In some instances, this could mean searching for and extracting key terms from the customer feedback, and loading those key terms into pre-formatted data items. The pre-processing or analysis of the customer feedback that is performed by the API could take many forms.

For example, in some embodiments the API within the production environment could examine and analyze individual items of customer feedback to determine a customer's intent in providing the customer feedback, as well as a desired outcome that the customer wishes to achieve by providing the customer feedback. In addition, the API could analyze individual items of customer feedback to determine a sentiment or emotional state of the customer when the customer left the item of customer feedback. All these individual items of information, the sentiment analysis, the intent and the desired outcome, can then be formatted into a data item for the customer feedback which is passed to the customer feedback receiving unit 1804.

Once information about customer feedback has been received by the customer feedback receiving unit, it could be analyzed or processed by the customer feedback analysis unit 1806. For example, if the API within a production environment forwards the raw data of customer feedback, the customer feedback analysis unit 1806 could analyze the raw data to extract key terms and/or to perform a sentiment analysis, and to extract the customer's intent and desired outcome, all as mentioned above.

Once any required analysis and processing has occurred, information about customer feedback is stored in one or more customer feedback databases 1808. In some embodiments, a specific customer feedback database could be created for each individual production environment. In other instances, a customer feedback database could store customer feedback information for multiple production environments.

The anomalous event unit 1810 collects, analyzes and stores information about anomalous events that have occurred within production environments. For example, an API installed within a production environment could be configured to report on any anomalous events or specific types of anomalous. The APIs could be configured to report anomalous events in real-time, as they occur. Alternatively, the APIs could log anomalous events and then periodically send information about the anomalous events to the anomalous event receiving unit 1812.

Also, the APIs within a production environment could simply log certain metrics about the operations of a production environment over time, and then send such logged information to the anomalous event receiving unit 1812 on a periodic basis. The anomalous event analysis unit 1814 could then analyze such logged data to determine if an anomalous event has actually occurred.

The APIs within a production environment could be passive in nature, or active. For example, if customer feedback received for a certain production environment appears to indicate that a specific type of problem may be occurring within a production environment, an active API could then be used to check the operating conditions within the production environment to confirm that the problem is actually occurring. Similarly, if customer feedback received for a production environment indicates that any of multiple different problems might be occurring within the production environment, one or more active APIs within the production environment could be used to pinpoint the actual issue giving rise to the customer feedback. All of these APIs would report information about anomalous events to the anomalous event receiving unit 1812.

Once information about anomalous events has been collected by the anomalous event receiving unit 1812, such information can be analyzed, processed and/or formatted by the anomalous event analysis unit 1814. As noted above, this could include analyzing logged event data to determine if an anomalous event has actually occurred. In some instances, received information could be processed and organized into predetermined data formats which make it easier to search for and use the anomalous event information.

Once any required processing and formatting has occurred, the anomalous event information is stored in one or more anomalous event databases. There could be individual anomalous event databases for each production environment. Alternatively, information about similar types of production environments could be stored in a single anomalous event database 1816.

The correlation unit 1818 then attempts to draw correlations between individual items or individual types of customer feedback, and the underlying causes or anomalous events that gave rise to the customer feedback. For example, if the anomalous event analysis unit 1814 has determined that an anomalous event has occurred within a first production environment, the feedback to anomalous event correlation unit 1820 would then look for the existence of individual items of customer feedback that have been provided for the first production environment at approximately the same time or shortly after the anomalous event occurred. If the feedback to anomalous event correlation unit 1820 finds multiple instances of customer feedback within the customer feedback databases 1808 which occurred at approximately the same time as the anomalous event, or shortly thereafter, a correlation between the anomalous event and the items of customer feedback might be established. The feedback to anomalous event correlation unit 1820 may try to link an anomalous event to one or more items of customer feedback based the system or sub-system in which the anomalous event occurred, and based upon whether the received customer feedback related to that system or sub-system. Information about the anomalous event and the corresponding items of customer feedback can then be stored in a correlations database 1822.

As mentioned above, artificial intelligence based analysis techniques may be quite helpful in identifying correlations between anomalous events stored in the anomalous event databases 1816 and customer feedback stored in the customer feedback databases 1808. Such an analysis might be performed using unsupervised clustering classification techniques, such as K-mean clustering, K++ clustering, Supported Vector Machines (SVM), Random Forrest, and other proprietary or improved algorithms related with clustering. In addition, such an analysis might be automatically performed using Fuzzy Logic methods, text semantic analysis such as TD-IDF, BM25, string distance measurement, or rule based deterministic approaches.

The feedback to anomalous event correlation unit 1820 might also use information about similar anomalous events that have occurred in multiple different production environments, and corresponding customer feedback received for those multiple production environments, to help draw correlations between a specific type of anomalous event and the corresponding types of customer feedback that are typically received when such an anomalous event occurs. Because the customer feedback and correlation unit 1800 can draw information about customer feedback and anomalous events from multiple different production environments, the correlation unit 1818 may be able to identify correlations between anomalous events and customer feedback that would be difficult or impossible to establish when working with the data from only a single production environment.

The information stored in the correlations database 1822 can be used in the future to help determine whether specific types of anomalous events may be occurring within a production environment when certain types of customer feedback are received for that production environment. For example, the correlations database 1822 may include information that indicates when a first type of anomalous event occurs, a first type of customer feedback is likely to be received. If the production environment begins to receive that first type of customer feedback, the receipt of that first type of customer feedback could indicate that the first type of anomalous event may be occurring within the production environment. System operators could then check to determine if that potential anomalous event is occurring. If so, an appropriate remediation action could be taken to solve the problem. In other instances, automated systems may be in place to check for the existence of one or more types of anomalous events within a production environment when certain types of customer feedback are received for that production environment.

Moreover, once a correlation has been established between a first type of anomalous event and a first type of customer feedback, that information can be used across a variety of different production environments. For example, once such correlation has been established based on information received from the first production environment, customer feedback received on a second production environment could be used by the potential cause identification unit 1824 to predict that the same type of anomalous event may be occurring within the second production environment.

Note, APIs may be installed within a first production environment to report certain types of anomalous events, whereas APIs to identify that type of anomalous event are not installed in a second production environment. Nevertheless, once the first type of customer feedback begins to be received on the second production environment, the potential cause identification unit 1824 could utilize information in the correlations database 1822 to predict that the first type of anomalous event is occurring within the second production environment, even though there are no APIs installed within the second production environment to identify that type of an anomalous event. This means that the customer feedback received for the second production environment is all that is necessary to predict that a certain type of anomalous event is occurring within the second production environment.

Figure 19:
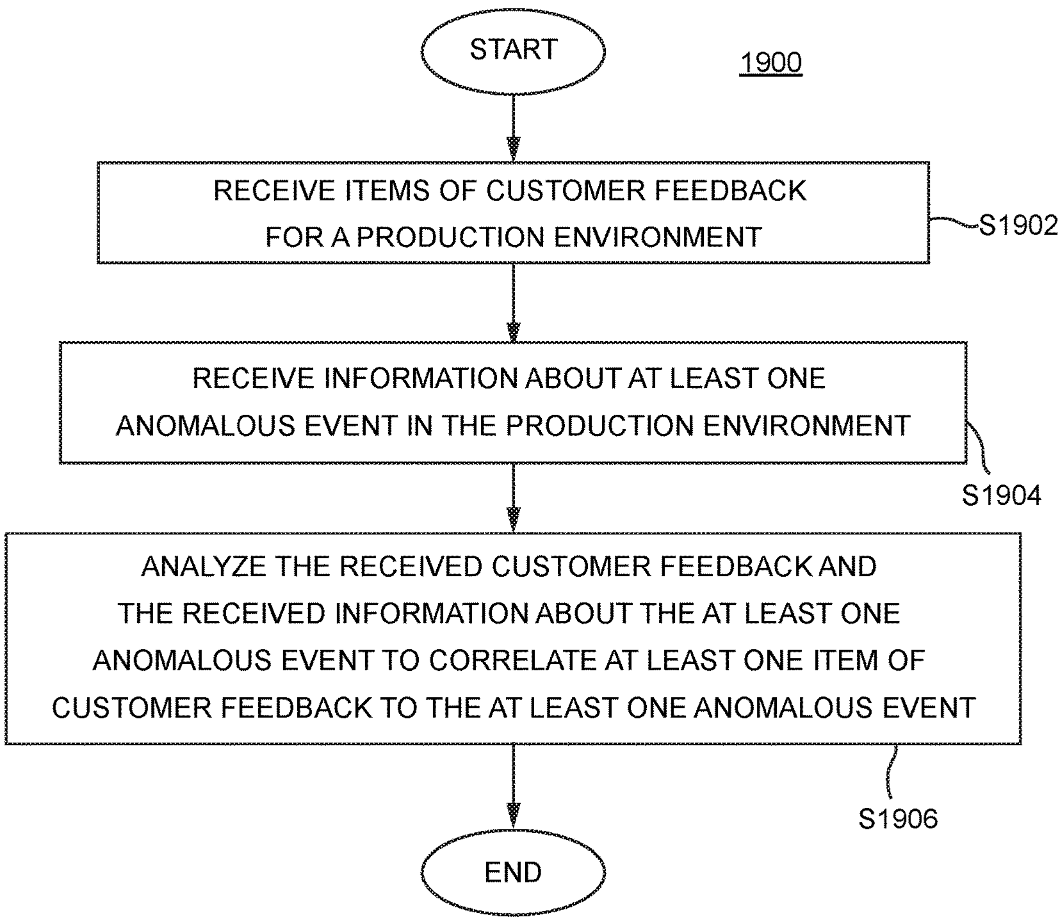
FIG. 19 is a flowchart illustrating steps of a method of analyzing customer feedback and reported anomalous events for a relating to a production environment to correlate an item of customer feedback to an anomalous event.

FIG. 19 illustrates steps of a first method for correlating at least one item of customer feedback to at least one anomalous event. The method 1900 begins and proceeds to step S1902 where the customer feedback unit 1802 of a customer feedback and correlation unit 1800 receives items of customer feedback for a production environment. The method then proceeds to step S1904 where an anomalous event unit 1810 receives an information about at least one anomalous event that occurred within the production environment. The method then proceeds to step S1906 where a feedback to anomalous event correlation unit 1820 uses the received information to identify a correlation between at least one anomalous event and at least one item of customer feedback. The method would then end.

Figure 20:
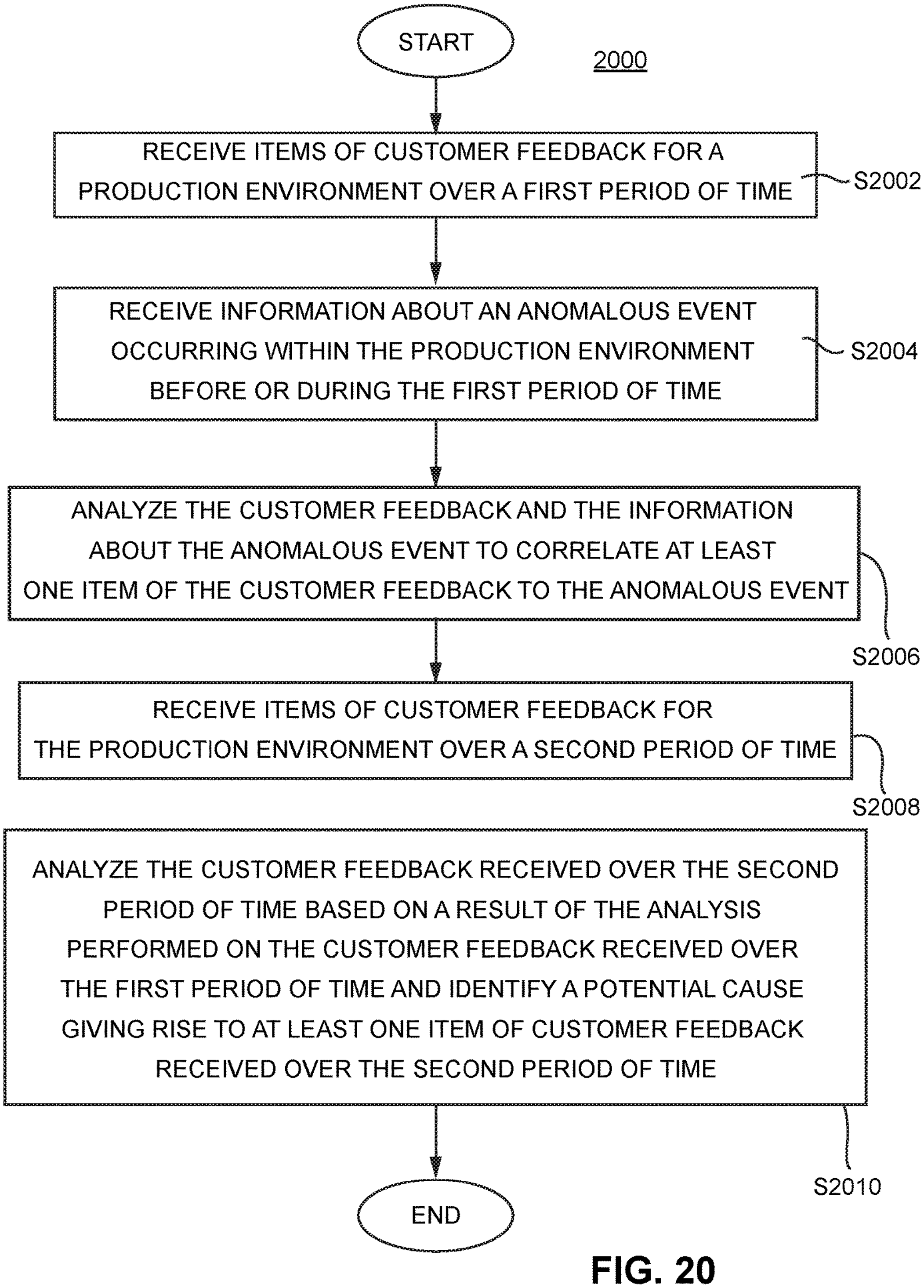
FIG. 20 is a flowchart illustrating steps of a method of identifying a potential cause giving rise to an item of customer feedback for a production environment received during a second time period based on earlier an analysis of customer feedback and at least one anomalous event that occurred during a first, earlier time period.

FIG. 20 illustrates steps of a method which is used to identify potential cause giving rise to at least one item of customer feedback. The method 2000 begins and proceeds to step S2002 where a customer feedback unit 1802 receives items of customer feedback for a production environment over a first predetermined period of time. The method then proceeds to step S2004 where anomalous event unit 1810 receives information about at least one anomalous event that occurred within the production environment before or during the first predetermined period of time.

The method then proceeds to step S2006 where a feedback to anomalous event correlation unit 1820 analyzes the received customer feedback and the information about the at least one anomalous event to correlate at least one item of a customer feedback to the at least one anomalous event. As noted above, information in a correlations database 1822 could be used by the feedback to anomalous event correlation unit 1820 to make this correlation.

The method then proceeds to step S2008 where a customer feedback unit 1802 receives items of customer feedback for the same production environment over a second predetermined period of time. The method then proceeds to step S2010 where the potential cause identification unit 1824 analyzes the customer feedback received over the second time period, based on a result of the analysis that was performed on the customer feedback received over the first time period, which may be reflected in the correlations database 1822, in order to identify a potential cause giving rise to at least one item of the customer feedback received over the second period of time.

For example, if a certain type of customer feedback was received during the first time period when a first type of anomalous event occurred within the production environment, and then the same or a similar (based on a probability calculation) type of customer feedback is received during the second period of time, the potential cause identification unit 1824 could operate in step S2010 to identify the same anomalous event as likely giving rise to the same type of customer feedback (containing the same or similar significant key terms) that was received during the second predetermined period of time. Thus, correlations made between particular types of customer feedback and anomalous events during a first time period can be used to predict whether the same type of anomalous events are occurring during a second time period whenever the same type of customer feedback is received during that second time period.

Figure 21:
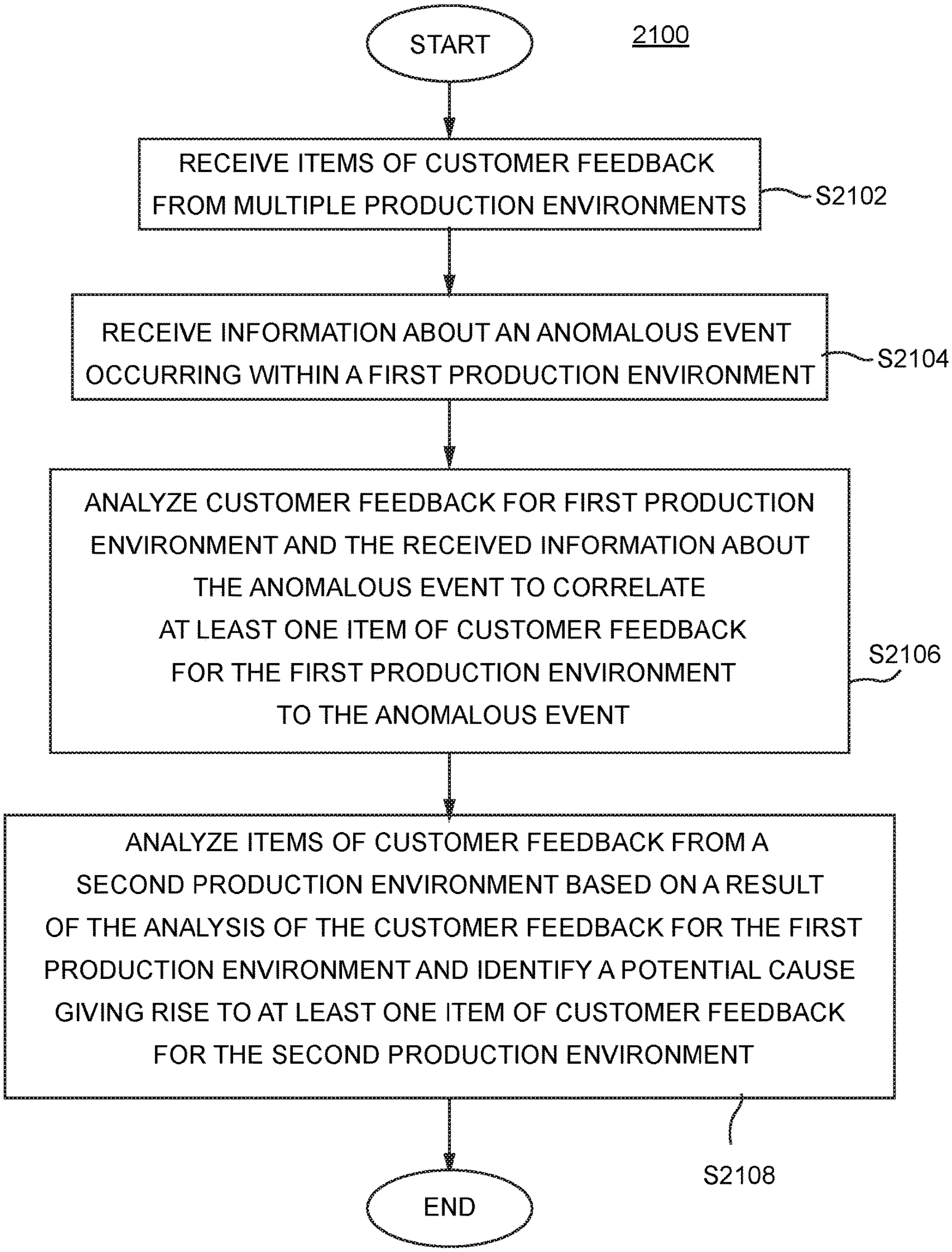
FIG. 21 is a flowchart illustrating steps of a method of identifying a potential cause giving rise to an item of customer feedback for a first production environment based on an analysis of customer feedback and at least one anomalous event occurring on a second production environment.

FIG. 21 illustrates steps of a method of identifying a potential cause giving rise to at least one item of customer feedback on a second production environment. The method 2100 begins and proceeds to step S2102 where a customer feedback unit 1802 receives items of customer feedback from multiple different production environments. The method then proceeds to step S2104 where an anomalous event unit 1810 receives information about an anomalous event occurring within a first production environment. The method then proceeds to step S2106 where a feedback to anomalous event correlation unit 1820 analyzes customer feedback provided for the first production environment and the received information about the anomalous event that occurred within the first production environment to correlate at least one item of customer feedback for the first production environment to the anomalous event.

The method then proceeds to step S2108 where a potential cause identification unit 1824 analyzes items of customer feedback received for a second production environment based, on a result of the analysis performed in step S2106, and identifies a potential cause giving rise to at least one item of the customer feedback received for the second production environment. For example, if the analysis performed in step S2106 indicated that a first type of customer feedback is received when a first type of anomalous event occurs, then the analysis performed by the potential cause identification unit 1824 in step S2108 could identify the same type of anomalous event as giving rise to the same type of customer feedback provided for second production environment.

Figure 22:
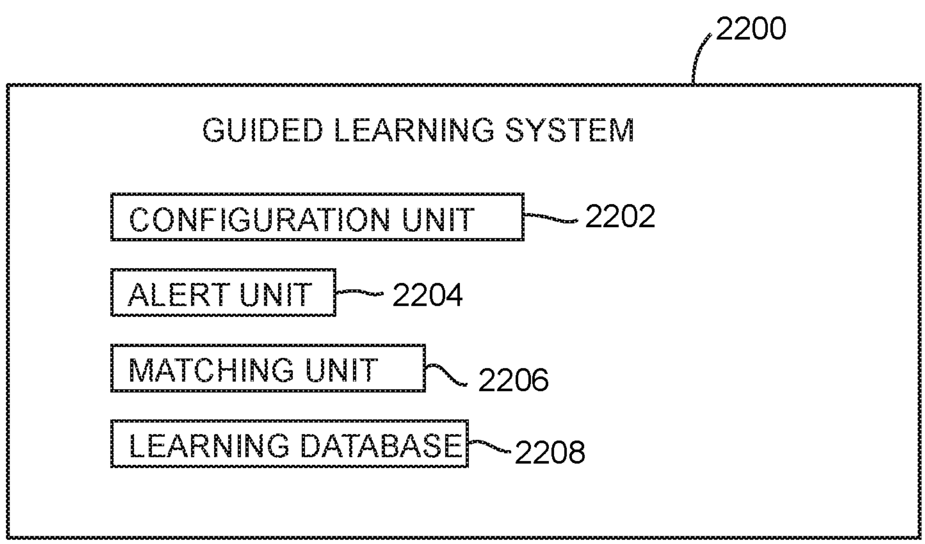
FIG. 22 is a block diagram of various elements of a guided learning system.

Another way that links can be established between anomalous events and the root causes of those anomalous events is via guided learning, which is performed by a system administrator. This can be accomplished with a guided learning system 2200, as illustrated in FIG. 22. Essentially, the system administrator reviews problems or errors that have occurred within the hardware and/or software of a production environment, as well as business problems or business impacts which have occurred, and the system administrator attempts to link a specific error or problem in the production environment to a specific business problem or impact. The guided learning system 2200 illustrated in FIG. 22 aids the system administrator in this process, and tracks and records the results of such guided learning.

Guided learning is typically performed for a specific production environment. That said, it is often possible to use information learned when performing guided learning on a first production environment to help identify the root causes of business problems or business impacts within a second, different production environment.

To perform guided learning for a production environment, one first uses a configuration unit 2202 to pre-identify typical system problems that can occur within the hardware and software of the production environment. Because each production environment is unique, the types of problems that can occur tend to be different for different production environments. Certainly, some types of problems may be common to many different production environments. Nevertheless, the configuration unit 2202 is designed to allow one to create a customized list of different potential hardware and/or software problems that could occur within the specific production environment in which the guided learning will be performed.

The configuration unit may also be used to create a list of potential business problems or impacts that could occur for the production environment. For example, if the production environment is used to provide an online retailing service, potential business problems or impacts could include customers being unable to make a purchase, or customers experiencing significant delays as they attempt to navigate the online retailing service. Here again, because each production environment is unique, the types of business problems or business impacts that could arise will vary for different production environments. The configuration unit 2202 allows one to create a customized lists of potential business problems or impacts that could arise for the specific production environment in which guided learning will be performed.

Once customized lists of potential hardware and software problems and potential business problems or issues have been created for the production environment, a system administrator can begin to attempt to match business problems or issues to the underlying root causes of those business problems or issues. In some embodiments, an alert unit 2204 may alert the system administrator when a business problem appears to be occurring. At that point in time, the system administrator could review the current status of the production environment's hardware and software to try to identify the root cause of the business problem.

If the system administrator believes that they have successfully identified the hardware and/or software problem that gave rise to the business problem, the system administrator can use a matching unit 2206 to identify the link between the hardware/software problem and the business problem. The matching unit 2206 could provide an interface that allows the system administrator to quickly and easily link the hardware/software problem to the business problem. For example, the system administrator could use drop-down menus that are based on the customized lists that have been created for the production environment to allow the system administrator to quickly link a business problem to the hardware/software problem that gave rise to the business problem.

In some embodiments, instead of informing the system administrator of a business problem that has occurred, the alert unit 2204 might inform the system administrator of a problem that has occurred within the hardware or software of the production environment. In this case, the system administrator could review the operational or business side of the production environment to determine if the hardware/software problem appears to be causing a business problem. If so, the system administrator would use the matching unit 2206 to link the hardware/software problem to a business problem.

In some embodiments, the alert unit 2204 would allow the system administrator to identify a link between a software/hardware problem and a business problem in "real time." In other words, as soon as a problem occurs, the alert unit 2204 would cue the system administrator to the problem and the system administrator could immediately begin to look for a link.

In other embodiments, the system administrator could be working from logs of hardware/software issues that have occurred in the past, as well as information about business problems that have occurred in the past, in order to link business problems to the underlying hardware/software problems that gave rise to the business problems.

Information about the links identified by system administrators are recorded in a learning database 2208. In some embodiments, the learning database 2208 is specific to a single production environment. In other embodiments, information about links from multiple production environments may be stored in a single learning database 2208. It may be appropriate to store information from multiple production environments in a single learning database 2208 if the production environments themselves are quite similar in nature.

Once information about the links between business problems and corresponding hardware/software problems have been stored in the learning database, the information can be used to help diagnose problems with a production environment. For example, if a particular type of business problem arises in a production environment, the linking information could be used to identify the likely cause or causes of the business problem. Also, linking information that has been recorded or established for a first production environment may be used to help diagnose the causes of business problems that are occurring in a second production environment, particularly if the two production environments are similar in nature.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A computer implemented method of correlating items of customer feedback to an anomalous event within a computer-based production environment, comprising:

receiving, with at least one processor, a plurality of items of customer feedback relating to a first production environment;

examining, with at least one processor, items of customer feedback to determine, for each examined item, an intent and a desired outcome for the item of customer feedback, wherein the intent comprises at least one reason why a customer provided the item of customer feedback, and wherein the desired outcome comprises a desired outcome that the customer wished to achieve when the customer provided the item of customer feedback;

receiving, with at least one processor, information about at least one anomalous event that occurred within the first production environment;

analyzing the received items of customer feedback using the intent and desired outcome that have been determined for each of the items of customer feedback, along with the received information about the at least one anomalous event to correlate at least one item of customer feedback to the at least one anomalous event; and wherein the analysis is based, at least in part, on a temporal connection between receipt of the at least one item of customer feedback and occurrence of the at least one anomalous event.

2. The method of claim 1, wherein the analysis takes into account key words appearing in the received customer feedback.

3. The method of claim 1, further comprising generating an event report that lists the at least one anomalous event and the intent and desired outcome of the correlated at least one item of customer feedback.

4. The method of claim 1, wherein the examining step also comprises examining items of received customer feedback to determine, for each examined item, a sentiment of the customer that provided the item of customer feedback and wherein the analysis of the received items of customer feedback also takes into account the sentiment determined for each examined item of customer feedback.

5. The method of claim 1, wherein the analyzing step comprises using artificial intelligence analysis techniques to correlate the at least one item of customer feedback to the at least one anomalous event.

6. The method of claim 1, wherein the analyzing step comprises analyzing a plurality of items of customer feedback that were received during a first predetermined period of time and information about at least one anomalous event that occurred during or just before the first predetermined period of time to correlate at least one item of the customer feedback received during the first predetermined period of time to the at least one anomalous event that occurred during or just before the first predetermined period of time, and wherein the method further comprises:

receiving, with at least one processor, a plurality of items of customer feedback relating to the first production environment that were provided by customers during a second predetermined period of time; and analyzing the plurality of items of customer feedback that were provided by customers during the second predetermined period of time, based on a result of the analysis conducted on the plurality of items of customer feedback that were received during the first predetermined period of time to identify at least one potential cause giving rise to at least one item of customer feedback that was provided by a customer during the second predetermined period of time.

7. The method of claim 1, further comprising:

receiving, with at least one processor, a plurality of items of customer feedback relating to a second production environment; and analyzing the plurality of items of customer feedback relating to the second production environment based on a result of the analysis conducted on the plurality of items of customer feedback for the first production environment and the information about the at least one anomalous event that occurred within the first production environment to identify at least one potential cause giving rise to at least one item of customer feedback relating to the second production environment.

8. The method of claim 1, wherein receiving a plurality of items of customer feedback comprises receiving, with at least one processor, a plurality of items of customer feedback via an Application Programming Interface (API) that is installed within the first production environment.

9. The method of claim 8, wherein the API obtains information about items of customer feedback relating to the first production environment from a customer service software application that is running within the first production environment, wherein the API uses the obtained information to generate, for each item of customer feedback, a structured data item that conforms to a standard format, and wherein the receiving step comprises receiving a plurality of structured data items generated by the API for a corresponding plurality of items of customer feedback.

10. A computer implemented method of correlating customer feedback relating to computer-based production environments to anomalous events that occur within those production environments, comprising:

receiving, with at least one processor, a plurality of items of customer feedback relating to first and second production environments;

examining, with at least one processor, items of customer feedback relating to the first production environment to determine, for each examined item, an intent and a desired outcome for the item of customer feedback, wherein the intent comprises at least one reason why a customer provided the item of customer feedback, and wherein the desired outcome comprises a desired outcome that the customer wished to achieve when the customer provided the item of customer feedback;

receiving, with at least one processor, information about at least one anomalous event that occurred within the first production environment;

analyzing, with at least one processor, a plurality of items of customer feedback relating to the first production environment that were received during a first predetermined period of time using the intent and desired outcome that have been determined for each of the items of customer feedback, along with information about an anomalous event that occurred within the first production environment during or before the first predetermined period of time to correlate at least one item of customer feedback for the first production environment to the at least one anomalous event that occurred within the first production environment; and analyzing, with at least one processor, a plurality of items of customer feedback that relate to the second production environment based on a result of the analysis conducted on the plurality of items of customer feedback and the information about an anomalous event for the first production environment to identify a potential cause that may have given rise to at least one item of customer feedback relating to the second production environment.

11. The method of claim 10, wherein the examining step also comprises examining items of received customer feedback to determine, for each examined item, a sentiment of the customer that provided the item of customer feedback and wherein the analysis of the received items of customer feedback also takes into account the sentiment determined for each examined item of customer feedback.

12. A system for correlating customer feedback to anomalous events for one or more computer-based production environments, comprising:

one or more computers programmed to perform operations comprising:

receiving a plurality of items of customer feedback relating to a first production environment;

examining, with at least one processor, items of customer feedback to determine, for each examined item, an intent and a desired outcome for the item of customer feedback, wherein the intent comprises at least one reason why a customer provided the item of customer feedback, and wherein the desired outcome comprises a desired outcome that the customer wished to achieve when the customer provided the item of customer feedback;

receiving information about at least one anomalous event that occurred within the first production environment; and analyzing the received items of customer feedback using the intent and desired outcome that have been determined for each of the items of customer feedback, along with the received information about the at least one anomalous event to correlate at least one item of customer feedback to the at least one anomalous event.

13. The system of claim 12, wherein the analysis is based, at least in part, on a temporal connection between receipt of the at least one item of customer feedback and occurrence of the at least one anomalous event.

14. The system of claim 12, wherein the examination also comprises examining items of the received customer feedback to determine, for each examined item, a sentiment of the customer that provided the item of customer feedback and wherein the analysis of the received items of customer feedback also takes into account the sentiment determined for each examined item of customer feedback.

15. The system of claim 12, wherein the analysis comprises analyzing a plurality of items of customer feedback that were received during a first predetermined period of time and information about at least one anomalous event that occurred during or just before the first predetermined period of time to correlate at least one item of the customer feedback received during the first predetermined period of time to the at least one anomalous event that occurred during or just before the first predetermined period of time, and wherein the one or more computers are also programmed to perform the operations of:

receiving a plurality of items of customer feedback relating to the first production environment that were provided by customers during a second predetermined period of time; and analyzing the plurality of items of customer feedback that were provided by customers during the second predetermined period of time, based on a result of the analysis conducted on the plurality of items of customer feedback that were received during the first predetermined period of time to identify at least one potential cause giving rise to at least one item of customer feedback that was provided by a customer during the second predetermined period of time.

16. The system of claim 12, wherein the one or more computers are also programmed to perform the operations of:

receiving a plurality of items of customer feedback relating to a second production environment; and analyzing the plurality of items of customer feedback relating to the second production environment based on a result of the analysis conducted on the plurality of items of customer feedback for the first production environment and the information about the at least one anomalous event that occurred within the first production environment to identify at least one potential cause giving rise to at least one item of customer feedback relating to the second production environment.

17. The system of claim 12, wherein receiving a plurality of items of customer feedback comprises receiving a plurality of items of customer feedback via an Application Programming Interface (API) that is installed within the first production environment, wherein the API obtains information about items of customer feedback relating to the first production environment from a customer service software application that is running within the first production environment.

18. The system of claim 17, wherein the API obtains information about items of customer feedback relating to the first production environment from a customer service software application that is running within the first production environment, wherein the API uses the obtained information to generate, for each item of customer feedback, a structured data item that conforms to a standard format, and wherein the receiving step comprises receiving a plurality of structured data items generated by the API for a corresponding plurality of items of customer feedback.

* * * * *